US008682581B2

(12) United States Patent
Psiaki et al.

(10) Patent No.: US 8,682,581 B2
(45) Date of Patent: Mar. 25, 2014

(54) VEHICLE NAVIGATION USING NON-GPS LEO SIGNALS AND ON-BOARD SENSORS

(75) Inventors: Mark Lockwood Psiaki, Brooktondale, NY (US); Isaac Thomas Miller, San Mateo, CA (US); Brent Michael Ledvina, San Francisco, CA (US)

(73) Assignee: Coherent Navigation, Inc., San Mateo, CA (US)

( * ) Notice: Subject to any disclaimer, the term of this patent is extended or adjusted under 35 U.S.C. 154(b) by 377 days.

(21) Appl. No.: 13/072,939

(22) Filed: Mar. 28, 2011

(65) Prior Publication Data

US 2011/0238307 A1    Sep. 29, 2011

Related U.S. Application Data

(60) Provisional application No. 61/317,867, filed on Mar. 26, 2010.

(51) Int. Cl.
 *G01C 21/00* (2006.01)

(52) U.S. Cl.
 USPC ........................................ 701/469; 342/357.2

(58) Field of Classification Search
 USPC .................. 701/469, 408; 342/357.2, 357.28, 342/357.44, 357.47–357.49, 357.71, 386, 342/358, 357.32, 357.395
 See application file for complete search history.

(56) References Cited

U.S. PATENT DOCUMENTS

| | | | |
|---|---|---|---|
| 5,450,329 A | | 9/1995 | Tanner |
| 5,583,776 A | * | 12/1996 | Levi et al. ..................... 701/400 |
| 5,812,961 A | | 9/1998 | Enge et al. |
| 6,147,644 A | * | 11/2000 | Castles et al. ................. 342/367 |
| 6,157,896 A | * | 12/2000 | Castles et al. ................... 702/95 |
| 6,373,432 B1 | | 4/2002 | Rabinowitz |
| 6,417,801 B1 | | 7/2002 | van Diggelen |
| 6,606,346 B2 | | 8/2003 | Abraham et al. |
| 6,651,000 B2 | | 11/2003 | van Diggelen et al. |
| 6,704,651 B2 | | 3/2004 | van Diggelen |
| 6,937,187 B2 | | 8/2005 | van Diggelen et al. |

(Continued)

FOREIGN PATENT DOCUMENTS

KR    1020090087300    8/2009

OTHER PUBLICATIONS

Alonso, R., and Shuster, M.G., "Complete Linear Attitude-Independent Magnetometer Calibration," Journal of the Astronautical Sciences, vol. 50, No. 4, Oct.-Dec. 2002, pp. 477-490.

(Continued)

*Primary Examiner* — Marthe Marc-Coleman
(74) *Attorney, Agent, or Firm* — Haynes and Boone LLP

(57) ABSTRACT

A navigation system includes a navigation radio and a sensor onboard a vehicle. The navigation radio receives and processes low earth orbit RF signals to derive range observables for a corresponding LEO satellite. A sensor is operable to generate at least one of vehicle speed data, acceleration data, angular rate data and rotational angle data under high vehicle dynamics. The navigation radio includes a navigation code operable to obtain a position, velocity and time solution (a "navigation solution") based on the one or more range observables, ephemerides for the corresponding LEO satellite, a heading pseudomeasurement, a navigation radio altitude pseudomeasurement; one or more vehicle velocity pseudomeasurements orthogonal to the altitude pseudomeasurements; and the generated at least one of vehicle speed data, acceleration data, angular rate data and rotational angle data. The navigation radio uses the navigation solution to acquire a GPS signal during interference with a coarse acquisition GPS signal.

23 Claims, 9 Drawing Sheets

(56) References Cited

U.S. PATENT DOCUMENTS

| | | |
|---|---|---|
| 7,042,392 B2 | 5/2006 | Whelan et al. |
| 7,158,080 B2 | 1/2007 | van Diggelen |
| 7,372,400 B2 | 5/2008 | Cohen et al. |
| 7,489,926 B2 | 2/2009 | Whelan et al. |
| 7,554,481 B2 | 6/2009 | Cohen et al. |
| 7,579,987 B2 | 8/2009 | Cohen et al. |
| 7,732,400 B2 | 6/2010 | Stern et al. |
| 7,978,130 B1 | 7/2011 | Cohen et al. |
| 8,035,558 B2 | 10/2011 | Cohen et al. |
| 2005/0156782 A1* | 7/2005 | Whelan et al. ........... 342/357.16 |
| 2005/0159891 A1 | 7/2005 | Cohen et al. |
| 2008/0001818 A1 | 1/2008 | Cohen et al. |
| 2008/0059059 A1 | 3/2008 | Cohen et al. |
| 2009/0091493 A1 | 4/2009 | Hwang et al. |
| 2009/0182502 A1 | 7/2009 | Riter et al. |

OTHER PUBLICATIONS

U.S. Appl. No. 12/815,012, filed Jun. 14, 2010, entitled Pedal Navigation Using LEO Signals and Body-Mounted Sensors, by Isaac Thomas Miller et al., pp. 1-34.

U.S. Appl. No. 12/889,238, filed Sep. 23, 2010, entitled Augmenting GNSS User Equipment to Improve Resistance to Spoofing, by Brent M. Ledvina et al., pp. 1-23.

U.S. Appl. No. 12/889,242, filed Sep. 23, 2010, entitled Assimilating GNSS Signals to Improve Accuracy, Robustness, and Resistance to Signal Interference, by Todd E. Humphreys et al., pp. 1-20.

U.S. Appl. No. 12/889,247, filed Sep. 23, 2010, entitled Simulating Phase-Coherent GNSS Signals, by Todd E. Humphreys, pp. 1-14.

* cited by examiner

VEHICLE NAVIGATION USING NON-GPS LEO SIGNALS AND ON-BOARD SENSORS

CROSS-REFERENCE TO RELATED APPLICATIONS

This application claims priority to provisional application No. 61/317,867, filed Mar. 26, 2010, titled "VEHICLE NAVIGATION USING NON-GPS LEO SIGNALS AND ON-BOARD SENSORS", which is incorporated herein in its entirety by reference.

This invention is made with Government support under Navy Contract N00173-08-C-2074 awarded by the Naval Research Laboratory. The Government has certain rights in the invention.

FIELD OF THE INVENTION

This invention relates generally to radio navigation and positioning systems and, more specifically, to systems for navigating under jamming or signal obstruction and high vehicle dynamic conditions.

BACKGROUND

Global Positioning Satellite (GPS) navigation has become the standard for most military and civilian navigation applications. There exist in both military and civil sectors hundreds of thousands of GPS or Global Navigation Satellite System (GNSS) receivers that are susceptible to signal jamming or other signal obstructions, e.g., buildings or urban canyons. Civilian or Standard Positioning Systems (SPS) rely on a non-encrypted, globally accessible signal. Military or Precise Positioning Systems (PPS) rely on encrypted GPS signals and require specially equipped receivers with cryptographic keys. For example, the military P-code is a very long (seven days long) PRN code, which is encrypted into a Y-code. More recently encrypted military M-code signals are broadcast from the GPS satellites. Military-grade receivers are capable of operating in a spoof-resistant mode in which a receiver tracks an encrypted ranging code whose pattern is unpredictable except to compliant and keyed user equipment.

Generally navigation receivers use a non-encrypted, repeating coarse acquisition (CA) code to estimate timing to narrow the search to acquire the military signal. While the coarse acquisition code repeats frequently and is generally readily acquired, jamming or other signal degradation or obstruction can make it difficult to establish a suitable position or timing fix with just the coarse acquisition code. Thus, under jamming conditions, alternative methods of determining a particularly precise position/timing fix are needed to acquire or lock on the non-repeating military Y-code signal. Military users may prefer the PPS due to the spoof resistance and authorized access features provided via encryption.

Brute force searches or estimations based on combinations of ground reference station data and/or non GNSS data may be sufficient in some cases to determine a positional and timing fix to acquire the military GPS Y-code under jamming. One promising proposed system employs Low Earth Orbit (LEO) satellite signals to supplement or augment GPS acquisition or positioning. For example, U.S. Pat. No. 5,812,961 (which is incorporated herein by reference in its entirety) describes the use of angular velocity of a LEO satellite to calculate a location vector by combining carrier phases for both LEO and GPS satellites. Additional LEO aided GPS systems are described in U.S. Pat. Nos. 6,373,432 and 7,732,400 (which are incorporated herein by reference in their entirety) and employ ground reference stations to provide increased positioning accuracy. The '961, '432 and '400 patents, however, suggest the use of a LEO satellite signal only to assist in acquiring or maintaining a GPS lock and are generally limited to scenarios with substantially static receiver conditions.

Still another proposed LEO satellite augmented GPS system employs an Inertial Measurement Unit (IMU) to further aid in obtaining greater positional accuracy. For example, U.S. Pat. No. 7,489,926 (which is incorporated herein by reference in its entirety) teaches that a previous IMU inertial positional fix may be recalled such that the IMU acts like a positional "flywheel" feedforward for GPS tracking in both time and space to bridge gaps or signal degradation intervals between GPS tracking locks. The navigation receiver uses the previous GPS lock and corresponding IMU positional fix along with LEO satellite data to estimate positional fixes in signal coverage gaps between GPS signal locks, e.g., under jamming, in urban canyons or tunnels, or other areas with signal blockages. The '926 patent, however, is generally limited to use of an IMU with LEO satellite data in scenarios in which a GPS lock, positional fix and IMU calibrations have previously been obtained and does not address true "cold start" scenarios in which the receiver is without the benefit of such previously obtained information. As used herein, the term "cold start" refers to a scenario in which there is no a prior information about the time, position, and attitude (orientation).

Many of the previously proposed systems are computationally costly and impractical in many field scenarios due to the positional accuracy needed to acquire a military GPS Y-code signal. In particular, the difficulty of acquiring a military GPS signal lock can be highly dependent on corresponding vehicle dynamics, with high vehicle dynamics (i.e., greater than about 12 mph) presenting an intractable obstacle to convergence on a positional solution sufficiently accurate to acquire the nonrepeating military GPS Y-code using previous methods. Stated otherwise, prior navigation systems have heretofore been unable to achieve calculation of a changing search envelope of sufficient accuracy to obtain a lock on a military GPS Y-code under jamming conditions and at high vehicle dynamics. This has generally been due to the conflict between the degree of accuracy of the search envelope required, the rate at which that envelope is changing at high vehicle dynamics, and the computational cost or delay in calculating the appropriate search envelope with prior systems.

Accordingly, improvements are sought in cold start acquisition and navigation under GPS jamming and high-vehicle dynamics.

SUMMARY

It has been discovered that it is possible to obtain a cold start lock on a GPS Y-code under jamming, even at high vehicle dynamics, using a Kalman filter with a LEO signal, e.g., Iridium™ signal, and outputs from onboard vehicle sensors, e.g., an inertial sensor, magnetometer, and altimeter. Thus, in some implementations, a navigation radio uses the Kalman filter to aid in GPS acquisition under jamming. In some implementations, the navigation radio and Kalman filter are used to provide a stand-alone, GPS-independent navigation solution or serve as an independent back-up to GPS, for example, in the presence of interference where GPS signals can be too faint to be registered. Interference can include both intentional and unintentional jamming, spoofing, or meaconing.

In some implementations, a geolocation Kalman filter is used to determine the position, velocity, orientation, and receiver clock offset and receiver clock drift rate of a navigation receiver in a wheeled vehicle. External radio navigation data used by the Kalman filter can include Iridium™ pseudorange and carrier Doppler shift frequency data from a suitable Iridium™ capable navigation receiver. In some cases, pseudorange data is sufficient without carrier Doppler shift frequency data. In addition, the Kalman filter uses data from an inertial sensor and a magnetometer or other heading sensor. Data from an altimeter or local terrain data are used to reduce precise geolocation from a three-dimensional problem to a two-dimensional problem using a altitude pseudomeasurement, e.g., using local terrain data or an altitude measurement. This altitude pseudomeasurement can also be used as a soft constraint on velocity in the vertical direction, e.g., based on terrain map data. A non-holonomic constraint of zero sideslip of the vehicle's rear wheels is also used as a pseudomeasurement to help reduce inertial sensor velocity drift. This non-holonomic velocity constraint is used as a velocity pseudomeasurement orthogonal to the altitude pseudomeasurement to further constrain the Kalman filter estimates.

In a particular implementation, the Kalman filter uses Iridium™ pseudorange and carrier Doppler shift frequency data, sensor data (e.g., inertial sensor data), heading data (e.g., magnetometer data), and altitude pseudomeasurement (e.g., altimeter data or local terrain data), and a non-holonomic constraint of zero-wheel-sideslip orthogonal to the altitude pseudomeasurement to obtain a precise positional and timing fix.

The Kalman filter can be used to aid GPS acquisition, e.g., under jamming for iGPS user equipment, or in a standalone GPS-independent solution. Given the Kalman filter position, velocity, clock error, and clock-error rate estimates, a GPS acquisition search space and frequency error variability can be sufficiently reduced to allow long coherent integration times. Accordingly, the Kalman filter can be used in long-dwell coherent integration applications to acquire jammed GPS signals. The time needed to acquire a GPS signal using long-dwell integration will not be excessive due in part to the small extent of the uncertainty in the code delay and carrier Doppler shift frequency.

In some implementations, the Kalman filter is used to provide a stand-alone navigation system. In some cases, a standalone GPs-independent system can achieve steady-state per-axis 1-6 position/clock accuracies on the order of about 10 m. This level of accuracy would suffice for many applications. Thus, a user navigation radio may implement the Kalman filter to obtain a suitable navigation solution independent of GPS, or suitable to aid in acquiring and tracking a military GPS signal.

The dynamic propagation and measurement models and calculations used by the Kalman filter are set forth in the detailed description. In some implementations, the Kalman filter is an extended Kalman filter (EKF). Although the described implementations use square-root information filtering (SRIF) techniques, other techniques may be used in some implementations.

In some implementations, FFT-based GPS acquisition searches and associated GPS range observable can be integrated with this Kalman filter to develop a hybrid Kalman filter that used both Iridium™ and GPS signals. In some cases, the Kalman filter does not use continuous Iridium™ or GPS carrier-phase measurements as navigation observables.

In some implementations, a real-time C/C++-code implementation of a Kalman filter is used in an iGPS system. Model simulation and testing of a particular Kalman filter is discussed in the detailed description.

In a particular implementation, the Kalman filter uses receiver outputs (both Iridium™ and GPS), inertial sensor outputs, and magnetometer outputs.

In a particular implementation, an inertial sensor, magnetometer and altimeter are integrated into the navigation system of a vehicle, e.g., a military wheeled vehicle. Additional onboard sensors such as a steering control unit, traction control unit, odometer, speedometer, optical cross-correlation camera or the like may also provide useful data to the navigation radio. While some implementations are described using an inertial sensor, any number of motion sensors, speed sensors or other suitable sensor may be used to provide data useful to the navigation radio.

In some applications, the navigation radio calculates a positional solution of sufficient accuracy under jamming conditions to acquire a lock on a military GPS Y-code. The method includes receiving, from one or more LEO satellites, RF signals at a navigation radio and digitizing and downconverting the RF signal via an RF front end to produce one or more baseband or digital intermediate frequency (IF) signals. One or more range observables for a corresponding LEO satellite are then derived from the one or more IF signals and satellite ephemerides are obtained for the corresponding LEO satellite. At least one of vehicle speed data, acceleration data, angular rate data and rotational angle data are generated by one or more sensors, e.g., inertial sensor, onboard a vehicle moving at high dynamics and are output to the navigation radio. An altitude pseudomeasurement for the navigation radio is determined based on local terrain data or sensor data, e.g., from an altimeter. One or more vehicle velocity pseudomeasurements are determined orthogonal to the altitude pseudomeasurement, e.g., side to side velocity or forward velocity. A heading pseudomeasurement is obtained, e.g., using a magnetometer. A position, velocity and time solution ("PVT solution") is then obtained based on the one or more range observables, ephemerides for the corresponding LEO satellite, the at least one of vehicle speed data, acceleration data, angular rate data and rotational angle data generated by one or more sensors, a heading pseudomeasurement, a navigation radio altitude pseudomeasurement and one or more vehicle velocity pseudomeasurements orthogonal to the altitude pseudomeasurement.

Under jamming conditions where the coarse acquisition code is not available, a suitably precise positional and timing fix may thus be obtained to allow acquisition of the encrypted military GPS signal. Even in high vehicle dynamics applications, the estimated position solution and the estimated time solution can be suitably obtained for cold start acquisition of a military GPS signal. In some cases, the estimated position solution is accurate to about 10 m.

In some applications, the one or more range observables includes at least one of a pseudorange measurement, carrier phase measurement, and a carrier Doppler shift frequency measurement.

In some cases the method is performed using an integrated Iridium™ and GPS receiver and a single antenna capable of receiving both GPS and Iridium™ signals. In some cases the method is performed using an Iridium™ only receiver to provide GPS-independent navigation.

In some cases, multiple LEO satellites may provide additional ranging sources allowing more rapid estimation of position and biases. Advantageously, LEO signals may be implemented with high power relative to GPS signals to better penetrate through interference or buildings. Accordingly, the navigation radio may be used as a GPS-independent solution, a back-up to GPS, or as a means to acquire a GPS signal under jamming.

In various embodiments, the navigation radio may be implemented as a handheld navigation device, a vehicle-based navigation device, an aircraft-based navigation device, or other type of positioning or navigation device.

In some applications, a vehicle navigation method includes receiving, from one or more LEO satellites, RF signals at a navigation radio and obtaining satellite ephemerides for a corresponding LEO satellite. The method further includes digitizing the RF signal via an RF front end to produce one or more digital IF signals and deriving one or more range observables for the corresponding LEO satellite from the one or more IF signals. An altitude pseudomeasurement is obtained for the navigation radio, e.g., using local terrain data or an altimeter or other sensor. The navigation radio receives at least one of vehicle speed data, acceleration data, angular rate data and rotational angle data generated by one or more sensors onboard a vehicle moving at high dynamics. A heading pseudomeasurement is obtained for the vehicle. A digital processor then computationally calculates a position, velocity and time solution ("navigation solution") based on the one or more range observables, ephemerides for the corresponding LEO satellite, the at least one of vehicle speed data, acceleration data, angular rate data and rotational angle data, the heading pseudomeasurement, the altitude pseudomeasurement and one or more vehicle velocity pseudomeasurements orthogonal to the altitude pseudomeasurement.

In some cases, the method further includes acquiring a GPS signal including one of a Y-code, M-code, encrypted GPS code, coarse acquisition code, military GPS code, and civil code based on the calculated navigation solution. In some cases, acquiring a GPS signal based on the calculated navigation solution is performed under jamming or under otherwise blocked coarse acquisition code conditions.

In some cases, the high dynamics of the vehicle includes speeds greater than about 12 mph and the estimated navigation solution is accurate to about 10 m.

In some cases, the one or more range observables includes at least one of a pseudorange measurement, carrier phase measurement, and a carrier Doppler shift frequency measurement. In some cases, the altitude pseudomeasurement is based on at least one of local terrain data, an altimeter measurement, and a barometer measurement. In some cases, the one or more vehicle velocity pseudomeasurements includes a vehicle velocity constraint of substantially zero wheel side-slip.

In some cases, the user navigation radio obtains the heading pseudomeasurement from at least one of a magnetometer, multi-antenna array, sun sensor, star tracker, digital compass, multiple hypothesis heading filter, and a LEO carrier phase measurement.

In some implementations, a navigation system includes a sensor onboard a vehicle and operable to output at least one of vehicle speed data, acceleration data, angular rate data and rotational angle data at high vehicle dynamics and a navigation radio electrically coupled to the sensor. The navigation radio includes an RF antenna operable to receive RF signals from one or more LEO satellites and an RF front end operable to downconvert and digitize the RF signals, e.g., to produce digital IF signals. A local oscillator is operable as a navigation radio clock reference and a digital processor is operable to derive one or more range observables from the digital IF signals for a corresponding LEO satellite. The DSP can determine a time offset between the local oscillator and a reference clock, e.g., for the corresponding LEO satellite. A navigation code is stored in media and includes instructions executable on the digital processor to obtain a position, velocity and time solution (a "navigation solution") based on the one or more range observables, ephemerides for the corresponding LEO satellite, at least one of vehicle speed data, acceleration data, angular rate data and rotational angle data, a navigation radio altitude pseudomeasurement and one or more vehicle velocity pseudomeasurements orthogonal to the altitude pseudomeasurements.

In some cases, the altitude pseudomeasurement is based on at least one of a local terrain data, and an altimeter measurement. In some cases, the navigation radio is positionally fixed with regard to a vehicle and the one or more vehicle velocity pseudomeasurements includes a vehicle velocity constraint of substantially zero wheel side-slip.

In some cases, the heading pseudomeasurement obtained via at least one of a magnetometer, multi-antenna array, sun sensor, star tracker, digital compass, multiple hypothesis heading filter, and a LEO carrier phase measurement.

In some cases, the navigation radio includes integrated LEO and GPS receivers. In some cases, a separate navigation receiver or radio is capable of processing GPS Y-code signals and operable to acquire a GPS Y-code signal based on the navigation solution obtained by the navigation code.

In some implementations, the navigation code comprises a measurement model, dynamics model and a state vector definition wherein the state vector definition includes a navigation radio position, a navigation radio velocity, an inertial sensor rate-gyro bias, an inertial sensor accelerometer bias; and a navigation radio attitude estimate and wherein the measurement model defines a relationship between the state vector and each of the range observables and pseudomeasurements. The measurement model, dynamics model and state vector definition are described below in the detailed description.

In some implementations, a navigation system includes a vehicle and a navigation radio positionally fixed with regard to the vehicle. An RF antenna is electrically coupled to the navigation radio and is operable to receive RF signals from one or more LEO satellites while an RF front end operable to downconvert and digitize the RF signals to produce digital IF signals. A digital processor is operable to derive one or more range observables from the digital IF signals for a corresponding (LEO) satellite. A local oscillator is operable as navigation radio clock reference for use in determining a timing offset relative to a LEO and/or GPS reference clock.

In some implementations, a sensor is positionally fixed with regard to the vehicle and coupled to the navigation radio to provide at least one of vehicle speed data, acceleration data, angular rate data and rotational angle data under high vehicle dynamics.

In some implementations, a heading sensor is positionally fixed with regard to the vehicle and is operable to output a heading pseudomeasurement to the navigation radio. A navigation code is stored in media and includes instructions executable on the digital processor to calculate a position, velocity and time solution (a "navigation solution") based on the one or more range observables, ephemerides for the corresponding LEO satellite, a navigation radio altitude pseudomeasurement, one or more vehicle velocity pseudomeasurements orthogonal to the altitude pseudomeasurement; a heading pseudomeasurement, and at least one of vehicle speed data, acceleration data, angular rate data and rotational angle data generated under high vehicle dynamics.

In some cases, the system includes a GPS radio and the LEO-based navigation solution is sufficiently accurate to allow acquisition of a GPS signal including one of a Y-code, M-code, encrypted GPS code, coarse acquisition code, military GPS code, and civil code under jamming or other blockage of a GPS coarse acquisition signal.

In some cases, the vehicle is one of a wheeled vehicle, an aircraft, and a boat. In the case of a wheeled vehicle, the one or more vehicle velocity pseudomeasurements includes a velocity constraint of substantially zero wheel side-slip. In the case of watergoing vessels, an anemometer may provide data useful as a velocity pseudomeasurement. In some pedestrian applications, an assumption of zero foot movement during contact with the ground may be useful in obtaining a navigation solution.

In some implementations, the sensor includes at least one of a wheel rate sensor, traction control unit, steering sensor, speedometer, odometer, tire pressure sensor, Pitot tube, and anemometer.

In some implementations, the heading pseudomeasurement is obtained via one of a magnetometer, multi-antenna array, sun sensor, star tracker, digital compass, multiple hypothesis heading filter, and a LEO carrier phase measurement. In some implementations, the altitude pseudomeasurement is based on at least one of an altimeter measurement, a barometer measurement, and local terrain data, e.g., a terrain map.

While the forgoing represents a description of certain illustrative embodiments of the present invention, it is to be understood that the appended claims recite features of the present invention(s), and that additional embodiments are contemplated and may fall within the scope of the claims.

BRIEF DESCRIPTION OF THE DRAWINGS

Various embodiments and implementations are described in detail below with reference to the following drawings.

DETAILED DESCRIPTION

The invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, antennas, digital signal processing elements, logic elements, look-up tables, or the like, which may carry out a variety of functions under the control of one or more microprocessors or other control devices. In addition, those skilled in the art will appreciate that the present invention may be practiced in conjunction with any number of data transmission protocols and that the system described herein is merely one exemplary application for the invention.

For the sake of brevity, conventional techniques related to signal processing, data transmission, signaling, global positioning systems, satellites, network control, and other such functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment. The invention may be implemented using any combination of hardware and software as may be appropriate given the particular circumstances.

Figure 1:
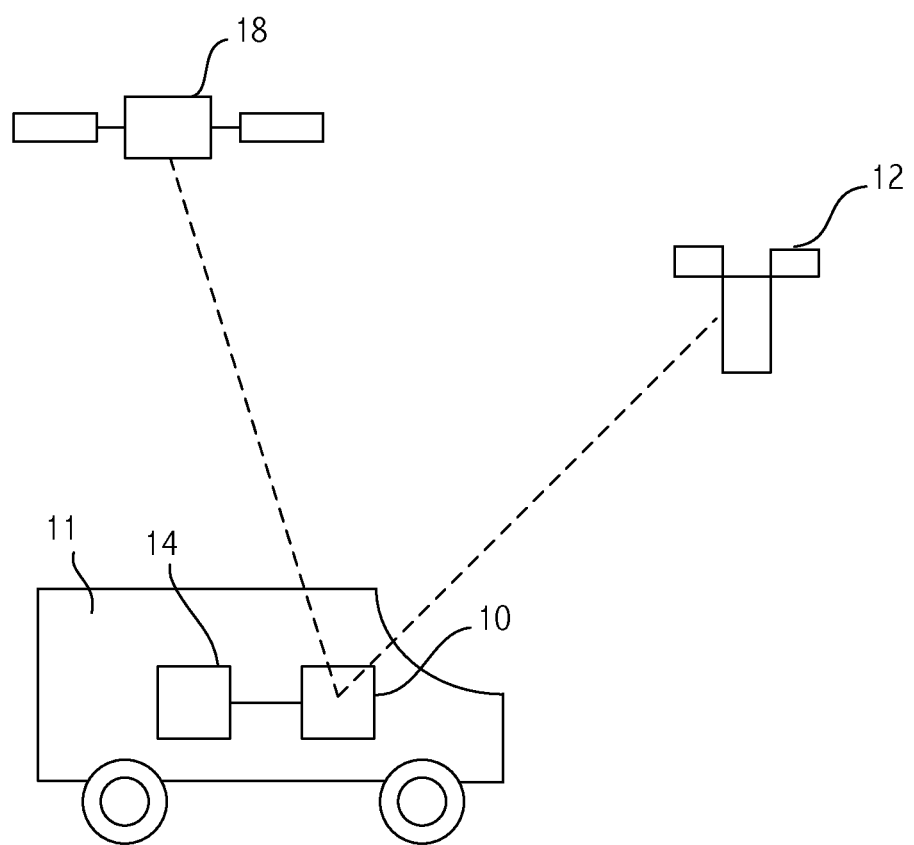
FIG. 1 is a block diagram of a navigation system using LEO satellites.

With reference to FIG. 1, navigation radio 10 is capable of providing a cold-start, stand-alone positional and/or timing solution based on signals from one or more LEO satellites 12. This can be particularly advantageous under jamming or when the coarse acquisition code is otherwise blocked, e.g., in buildings or urban canyons. Navigation radio 10 can be positionally fixed in a vehicle 11 in combination with an inertial sensor 14, or other suitable sensor, and is further capable of providing a cold-start, GPS-independent navigational solution under high vehicle dynamics. In particular, navigation radio 10 uses a heading pseudomeasurement, one or more altitude pseudomeasurements, e.g., local terrain data or altimeter data, one or more vehicle velocity pseudomeasurements, e.g., side to side velocity or forward velocity, orthogonal to the altitude pseudomeasurement and one or more inertial sensor inputs to obtain a navigation solution. In some cases, the vehicle side-to-side velocity is assumed to be zero, i.e., without any side slip for a given heading. In some cases, additional on-board vehicle sensors can be used to aid or substitute for inertial sensor data. For example, vehicle speedometer, steering or traction control systems, or other existing vehicle sensors or controls may provide data useful to navigation radio 10.

In some applications, the LEO satellite 12 is an Iridium™ satellite providing data useful to navigation radio 10 in obtaining a timing, positional or navigational solution. Any number of existing or future LEO constellations may be suitable for the present invention including Iridium™ and Globalstar™. In some applications, the timing, positional or navigational solutions can be used to initialize a Y-code positioning function of navigation radio 10 to acquire a lock on a military signal from one or more GPS satellites 18. Thus, navigation radio 10 can be equipped to receive both Iridium™ and GPS signals.

It is advantageous for the Iridium™ clock to be synchronized to a GPS clock via a common precision oscillator reference for both the GPS and Iridium™ timing and ranging measurements to reduce the time needed to acquire the GPS code. Methods of obtaining timing data for a LEO satellite are disclosed in US. Pub. No. 20090315764, which is incorporated herein by reference in its entirety. Thus, navigation radio 10 first acquires the Iridium™ or other LEO timing/signal, then searches for and acquires the GPS timing/signal as described below. Clock synchronization or determination of a clock offset between a navigation radio clock and the LEO and/or GPS reference clock, in some cases, can be carried out using LEO satellite to transfer time from a known source, e.g., at reference station.

Figure 2:
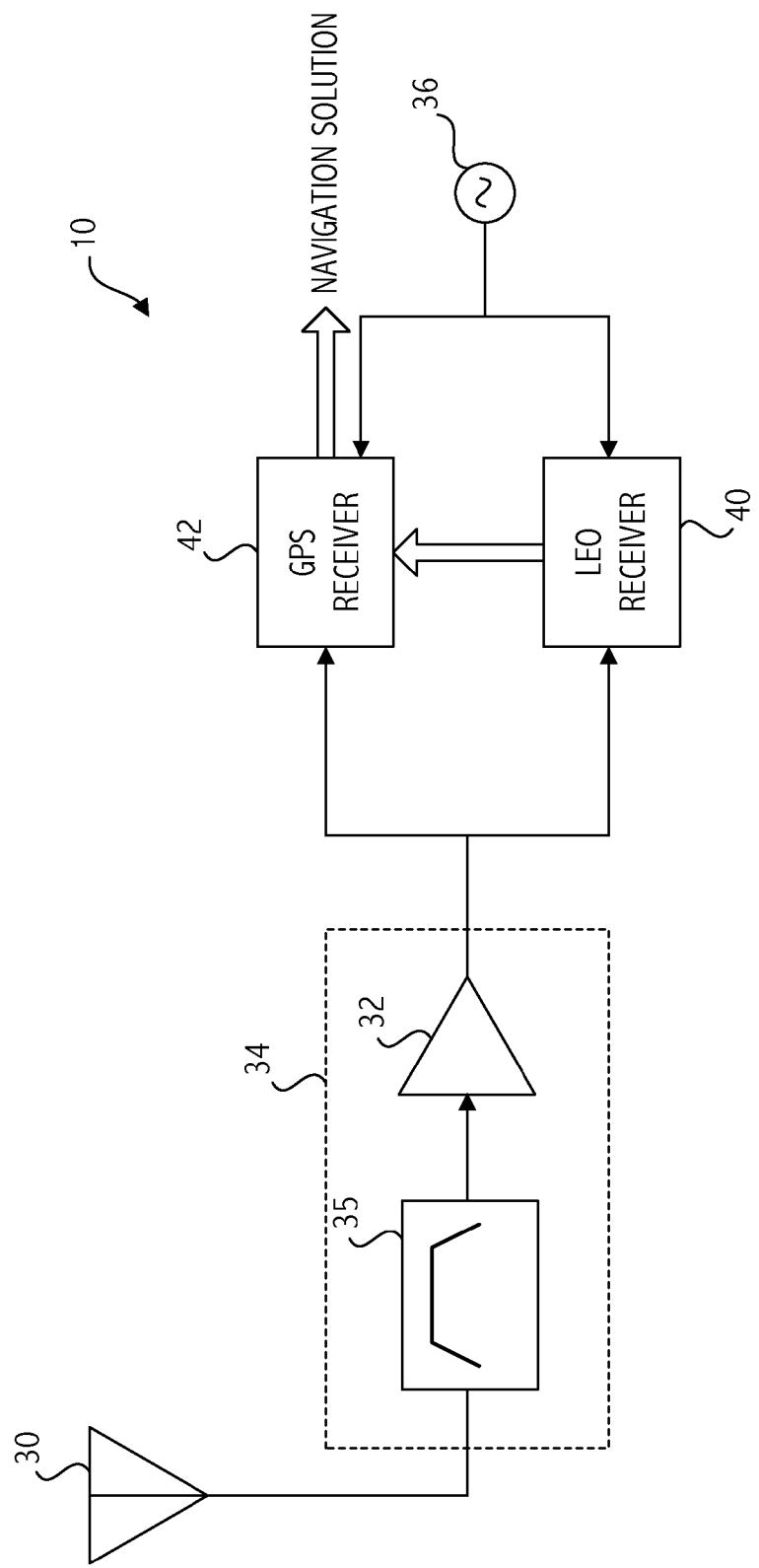
FIG. 2 is a block diagram of a navigation radio.

In the form of FIG. 2, the basic architecture for navigation radio 10 includes a dual band antenna 30 to receive both the Iridium™ signal and the L1 and L2 GPS signals, front end 34 including a bandpass filter 35, preamp 32 and Iridium™ and GPS receivers 40/42 coupled to a common clock 36, e.g., reference crystal oscillator. Navigation radio 10 calculates an estimate of the navigation radio clock bias. The RF front-end 34 draws in signals from the antenna 30 and filters, mixes, and digitizes the signals. The output of the RF front-end 34 is a stream of digital data samples that is routed to the receiver modules 40/42. Clock bias or time offset may include any timing bias in the system and may compensate for measured errors in a satellite clock, reference station clock, multiple receiver clocks and/or time slot changes in a transmission sequence and the like. A clock calibration routine is used to identify frequency offset of the LEO satellite reference oscillators and the receiver oscillator.

The front end 34 can output composite LEO/GPS data or may provide discrete LEO and GPS signal data to discrete receivers 40/42. Many GPS receivers have RF front ends downconverting to an intermediate frequency, however, a direct downconversion to baseband may be used.

In some implementations, navigation radio 10 includes a separate Iridium™ receiver 40 and clock to augment or upgrade a legacy GPS system, for example to provide anti jamming and/or anti-spoofing capabilities. In some implementations, the Iridium™ receiver 40 is integrated into a single navigation radio with the GPS receiver 42 and a common clock. In some cases, an anti-spoofing module may have a discrete clock reference. Clock synchronization circuits can synchronize the clock of the legacy GPS radio, the Iridium™ receiver clock and other systems clocks. Suitable clock synchronization techniques are disclosed in U.S. patent application Ser. No. 12/434,026, titled Practical Method for Upgrading Existing GNSS User Equipment with Deeply Integrated Nav-Com Capability and filed May 1, 2009 and which issued as U.S. Pat. No. 7,978,130 on Jul. 12, 2011, which is incorporated herein by reference in its entirety.

Figure 3:
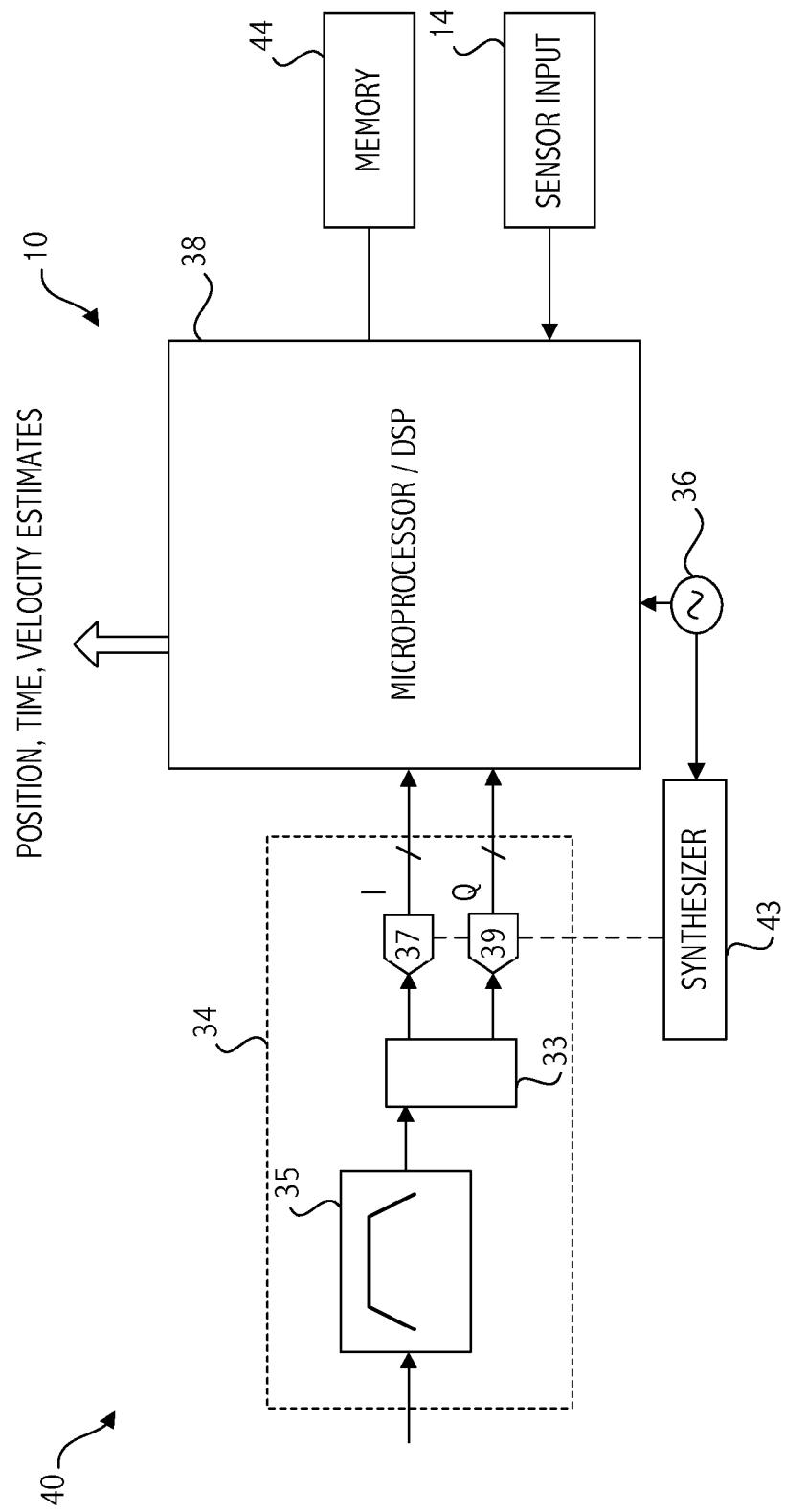
FIG. 3 is a block diagram of a navigation radio configured for use with a LEO satellite and an onboard vehicle inertial sensor.

With reference to FIG. 3, LEO receiver 40 includes memory 44 and microprocessor or DSP 46. Structurally, the DSP 46 processes computer programming instructions stored in memory 44, e.g., to determine navigation radio position. In some cases, navigation radio 10 may employ an integrated LEO/GPS receiver 40/42 using a common memory 44 and microprocessor or DSP 38. A synthesizer 43 provides a coherent sine wave and clock signals to be used by other radio components based on a clock signal received by the synthesizer. For example, inertial sensor 14 provides accelerometer and rate-gyro measurements time tag synchronized to the receiver clock and may be used to provide raw digital motion samples. Inertial sensor 14 is coupled to navigation radio 10 and provides inertial data, e.g., angular rate data and acceleration data input to DSP 38. Sensor 14 can include an inertial sensor, an IMU, an integrated multi-axes accelerometer or may include discrete single axis accelerometers or gyros. For example, in some cases, the velocity pseudomeasurement of no-side slip could be verified by a single axis inertial sensor to allow for occasional minute lateral movement, e.g., on icy, muddy or sandy surfaces. In some implementations, sensor 14 may be a high-performance navigation grade inertial device, a chip scale inertial device, a chip scale MEMS gyro, a MEMS accelerometer or the like. Combinations of a single axis or multi-axis accelerometers and gyroscopes may be used in some cases.

The DSP 38 provides estimation capability in the form of a Kalman Filter which combines available information, including that from Iridium™, the inertial sensor and other sensors, such as a barometer or magnetometer as well as information stored in memory 44, such as local terrain data or satellite ephemeris data, e.g., precise satellite orbital data sets. The ephemeris data are used with an algorithm that computes the satellite position for any time within the period of the orbit described by the ephemeris parameter set. A navigation code is stored in memory 44 and includes instructions executable on DSP 38 to precisely calculate the receiver position based on various state inputs to a Kalman filter as described herein.

The Kalman filter produces estimates of the true values of measurements and their associated calculated values by predicting a value, estimating the uncertainty of the predicted value, and computing a weighted average of the predicted value and the measured value with the most weight given to the value with the least uncertainty. The weights are calculated from the covariance, a measure of the estimated uncertainty of the prediction of the system's state. The result of the weighted average is a new state estimate that lies in between the predicted and measured state, and has a better estimated uncertainty than either alone. This process is repeated every time step, with the new estimate and its covariance informing the prediction used in the following iteration. The Kalman filter uses a dynamics model (i.e. physical laws of motion), known control inputs to that system, and sensor measurements to form an estimate of the system's state that is better than the estimate obtained by using any one measurement alone.

The rapid angle motion of LEO satellites enables the timing (code phase) and carrier phase of the incoming Iridium™ signal to be determined precisely and ranging functions to be executed precisely. Thus, rapid angle motion of LEO satellites in combination with inertial sensor inputs and altitude and orthogonal velocity constraints can be used to obtain a suitable stand-alone navigation solution, or to acquire a GPS Y-code signal or other GPS signals.

By accurately modeling and estimating the LEO satellite's position and user navigation radio position states, including clock parameters, the Kalman Filter provides a precise model and means to obtain a cold start, GPS-independent navigation solution, which may then be used to acquire a military GPS signal. In addition to the raw measurements collected from Iridium™ and the inertial sensor, the Kalman filter can use additional sensor inputs from a magnetometer and barometric altimeter.

Aspects of the invention may be implemented as either software or hardware and are not limited to the illustrative forms described. For example, software aspects of the receiver 40 may be advantageously upgraded and maintained remotely in some implementations.

The front end 34 of the receiver 40 downconverts the RF LEO or GPS signal into an intermediate frequency (IF) signal which is output to the DSP 38. The front end can carry out various bandpass, automatic gain control (AGC), direct RF sampling and A/D conversion functions and may use direct or traditional inphase and quadrature downconversion schemes. For example, a hybrid coupler 33 can separate the signal into inphase and quadrature components and A/D converters 37, 39 can sample incoming inphase and quadrature signals and output to DSP 38 digital data useful to derive a LEO range observable. For example, DSP 38 can derive at least one of a pseudorange, carrier phase or Doppler shift range observable for a corresponding LEO satellite. DSP 38 can determine a clock offset between clock 36 and a LEO or GPS reference clock. DSP 38 may perform any number of routines with received signals or data including extracting ephemeris information for a corresponding LEO satellite.

Memory 44 stores data and computer programming instructions for processing. Memory 44 may be an EEPROM chip, electromagnetic device, optical storage devices, or any other suitable form or type of storage medium. Memory 44 can store, inter alia, ephemerides for the corresponding LEO satellite, local terrain data, and any type of data derived from the received RF signals, inertial sensor or other sensor outputs, user inputs, or other suitable data source. For example, in some cases, the ephemerides are transmitted or obtained through other than a LEO signal, e.g., via a ground reference station or over a wireless network connection.

The ephemeris data or ephemerides for the LEO satellite generally provide parameters which allow for the computation of a satellite position at a particular time. Ephemeris data may be conveyed and updated via any suitable input, e.g., satellite signal, reference station signal, internet connection, line modem, or local memory update. The ephemerides can also include other information useful by DSP 40 to obtain accurate timing and positional solutions, e.g., data relating to an Iridium™ clock or target GPS clock. Navigation radio 10 can thus derive an initial clock bias estimate relative to an Iridium™ satellite or other LEO satellite and then use this clock bias estimate to more accurately narrow the bias window of the acquisition search for a GPS signal, e.g., an encrypted military Y-code signal. In this described case, the DSP can calculate a clock bias, however, any number of DSPs or other processors may be used to perform individual routines, or combinations or subsets or routines described herein.

Figure 4:
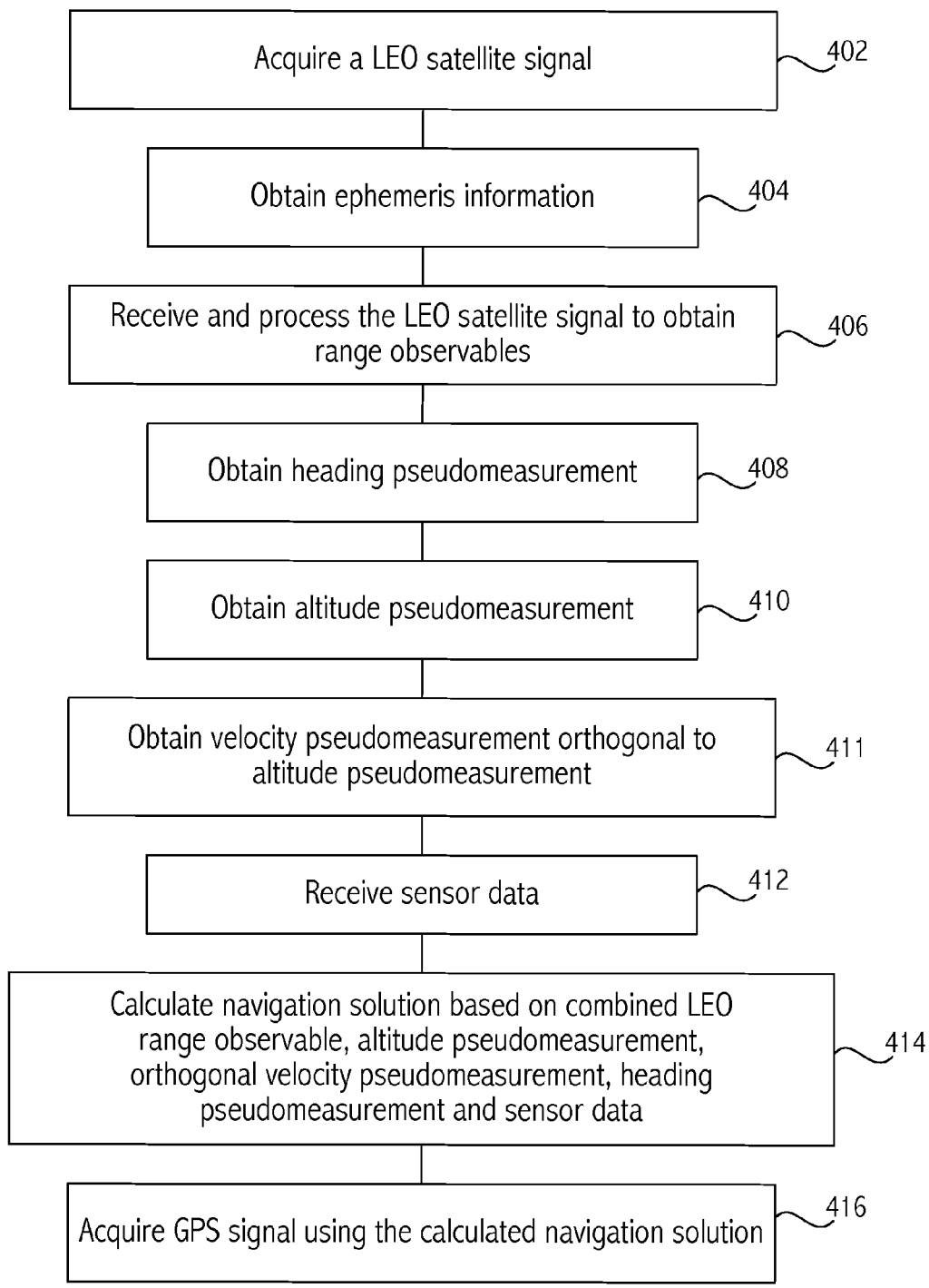
FIG. 4 is a flow diagram of a method for obtaining a positional fix suitable for acquiring a GPS signal under jamming.

With reference to FIG. 4, a method of obtaining a cold-start, GPS-independent navigation solution is described. The navigation radio acquires a LEO satellite signal (block 402) and obtains corresponding ephemeris information (block 404). The LEO satellite signal is received at a navigation radio and is processed to obtain suitable range observables (block 406). Processing the RF signal can include digitizing the RF signal via an RF front end to produce one or more digital IF signals. A heading pseudomeasurement for the navigation is obtained (block 408). An altitude pseudomeasurement is obtained, e.g., via an altimeter or local terrain data (block 410). At least one velocity pseudomeasurement orthogonal to the altitude pseudomeasurement is established. (block 411). Sensor measurement data is obtained under high vehicle dynamics, e.g., speedometer data, including the at least one of vehicle speed data, acceleration data, angular rate data and rotational angle data (block 412). A velocity pseudomeasurement of substantially zero side-slip may be used for wheeled vehicles. Additional vehicle sensors can provide any number of additional useful data or input to the navigation radio. The Kalman filter or other suitable estimator operable on a digital processor is used to calculate a navigation solution with vehicle position, time and/or velocity solutions based on combined LEO range observable, heading pseudomeasurement, altitude pseudomeasurements, sensor measurements, and velocity pseudomeasurements orthogonal to attitude pseudomeasurement (block 414). A GPS receiver may then use the navigation solution to acquire a GPS signal, e.g., Y-code. (block 416). For example, once the receiver clock bias and navigation solution has been established, the navigation radio 10 may then search for the GPS clock/signal within an established bias window or search envelope.

The Kalman filter updates the navigation solution estimation using all inputs received within a predetermined epoch or window, e.g., 20 ms period. In some cases, the estimate can be updated with each new input of a selected type. Navigation radio position is initialized in a cold start by determining which Iridium™ satellite is in view and which of the 48 Iridium™ satellite beams the radio is in. In some substantially static scenarios, determination of the relevant beam coverage can be sufficient to determine the receiver clock bias within less than a millisecond, allowing a GPS lockup time to Y-code of less than one minute when the receiver is stationary. This clock bias and lockup time are significantly affected by high-vehicle dynamics, which are accounted for in the estimation calculations described below.

High-dynamic operation of a vehicle (e.g., above 12 mph) typically introduced sufficient receiver time bias uncertainty to effectively prevent the acquisition search from converging with prior iGPS or similar navigation systems. Indeed, many of skill in the art previously considered a high-dynamics, cold-start, GPS Y-code acquisition under jamming to be an intractable problem. Higher speeds and/or extended travel ranges were found to result in a failure to sufficiently fix the vehicle position to acquire the GPS Y-code.

It has now been discovered, however, that a combination of a LEO signal range observable, vehicle sensor inputs and velocity pseudomeasurements may be used to sufficiently reduce uncertainties or constrain the positioning solution and GPS acquisition search, even at high dynamics. Several methods of performing a cold start, high-dynamics GPS acquisition under jamming are described in detail below.

In some implementations, the navigation radio obtains ephemeris data for the corresponding Iridium™ satellite and obtains a range observable from the LEO signal useful in determining the position of the navigation radio. In some applications, the range observable is a pseudorange measurement representing the distance between the satellite and receiver and may be computed using satellite ephemerides, suitable knowledge of the position of the receiver and approximate time. In some cases, simple LEO beam coverage methods may be used to determine the position of receiver unit based on the present beam location and recent beam time history.

In some applications, the range observable is a carrier phase measurement based in part on a relative distance measurement obtained using a ground reference station, which may not be available in many scenarios. For example, U.S. Pat. No. 6,373,432, which is incorporated herein by reference, describes the use of carrier phase information derived from LEO satellites signals in combination with reference carrier phase information to calculate a navigation radio position. Similar carrier phase measurements could likewise be used to determine an initial position fix in some applications.

In some applications, the range observable used to estimate or refine the radio position is a Doppler profile of the Iridium™ satellite. For example, the navigation radio can monitor the ranging signals from an Iridium™ satellite to measure the Doppler shift over a time period, e.g., using satellite timing data and orbital information similar to the earlier TRANSIT system. Thus, the Doppler shift of the Iridium™ satellite can also be tracked in order to determine user position. The Doppler shift is measured as the satellite passes overhead and can provide a suitable determination of the navigation radio position. Thus, in some cases, the range observable used to estimate the navigation radio position is performed based at least in part on the Doppler shift or Doppler profile of the Iridium™ satellite. In some cases, positional measurements using pseudorange or Iridium™ antenna beam measurements may yield a faster solution than waiting for sufficient satellite movement for Doppler shift data to be generated, particularly if multiple Iridium™ satellites are in view. Nevertheless, refinement using Doppler measurement profiles may be useful in some cases. Accordingly, any suitable type or combination of range observables may be useful to the navigation radio in determining precise positioning.

Once the position of the navigation radio relative to the LEO satellite is determined, whether using pseudorange measurement, carrier phase measurement and/or Doppler shift measurement, the positional fix and receiver clock bias information may then be used to search for the GPS signal. The navigation radio may then search for and acquire the GPS Y-code signal to be used in ongoing precise positioning or navigation.

In some applications, an initial LEO signal acquisition algorithm performs a signal search routine to establish a phase lock on a LEO satellite based on corresponding ephemeris data. The phase lock is maintained via phase-locked loops and tracking controls. Received LEO data is then downconverted and sampled via an RF front end, e.g., to provide IF signals to be used by a digital signal processor. A pseudorange measurement or other range observable is derived from the downconverted RF signals and stored in local memory. The pseudorange measurement can be used to obtain a position estimate and clock offset estimate. A calculation routine involves a navigation code or algorithm including various corrections of pseudomeasurements and parameters as described in detail below. The navigation code employs the LEO satellite ephemeris information, range observable, altitude pseudomeasurement, heading pseudomeasurement, velocity pseudomeasurement, sensor data (e.g., inertial sensor data), and Kalman filtering techniques to combine the range observable, sensor data and pseudomeasurements or other constraints on the vehicle motion to calculate a suitably precise position estimate to search for and lock onto a GPS Y-code signal or other GPS signal under jamming and high vehicle dynamic conditions.

Operation of a navigation code using a Kalman filter with on-board vehicle sensor data, e.g., inertial sensor data, LEO satellite range observables, and various altitude, heading and velocity pseudomeasurements according to some implementations will now be described in detail.

I. State Vector Definition and Filter Dynamics Model

The Kalman filter dynamically propagates and updates estimates of a 21-dimensional state vector. That vector is defined as follows:

$$x_k = \begin{bmatrix} \delta t_R(t_k) \\ \delta f_R(t_k) \\ b_{rg}(t_k) \\ b_{acc}(t_k) \\ q(t_k) \\ r(t_k) \\ v(t_k) \\ \Delta B_{igrf}(t_k) \end{bmatrix} \quad (1)$$

where $t_k$ is the sample time at which the estimate applies as measured by the receiver clock, $\delta t_R(t_k)$ is the receiver clock time error in units of seconds, $\delta f_R(t_k)$ is the receiver clock's frequency error in sec/sec, $b_{rg}(t_k)$ is the 3-dimensional rate-gyro bias vector in rad/sec units and given in IMU axes, $b_{acc}(t_k)$ is the 3-dimensional accelerometer bias vector in m/sec² units and given in IMU axes, $q(t_k)$ is the 4-dimensional, unit-normalized quaternion which parameterizes the attitude rotation that transforms from Earth-Centered/Earth-Fixed (ECEF) coordinates to IMU body-fixed coordinates, $r(t_k)$ is the 3-dimensional Cartesian position vector of the IMU coordinate system's center as measured in ECEF coordinates in units of meters, $v(t_k)$ is the 3-dimensional velocity vector of the IMU coordinate system's center as measured with respect to ECEF coordinates and expressed along the ECEF axes in units of meters/sec, and $\Delta B_{igrf}(t_k)$ is the 3-dimensional residual error vector in the International Geomagnetic Reference Field (IGRF) model of the Earth's magnetic field expressed in ECEF coordinates in units of nanoTesla (nT). Note that 100 nT=1 milliGauss and that typical magnetic field strengths near the Earth's surface range from 30,000 to 50,000 nT, i.e., from 300 to 500 milliGauss. The ECEF coordinate system is defined with its Z axis pointing along the North Pole axis and with its X axis pointing through the intersection of the equator and the Greenwich meridian.

The magnetic field model error is presumed to be constant over the period of filtering. This assumption is modified if the filtering period is very long or if the vehicle travels a large distance during the filtering interval.

The true time of the sample is $t_{truek}=t_k-\delta t_R(t_k)$. All times are referenced to the beginning of the GPS week.

The clock model includes time (i.e., phase) and frequency random-walk components and takes the form:

$$\begin{bmatrix} \delta t_R(t_{k+1}) \\ \delta f_R(t_{k+1}) \end{bmatrix} = \begin{bmatrix} 1 & \Delta t_k \\ 0 & 1 \end{bmatrix} \begin{bmatrix} \delta t_R(t_k) \\ \delta f_R(t_k) \end{bmatrix} + \sqrt{\Delta t_k} \begin{bmatrix} a_k & 0 \\ b_k & c_k \end{bmatrix} w_{clk} \quad (2)$$

where $\Delta t_k = t_{k+1} - t_k$ and where $$a_k = \sqrt{S_f + \frac{1}{3} S_g \Delta t_k^2}, \quad (3a)$$

$$b_k = \frac{\frac{1}{2} S_g \Delta t_k}{\sqrt{S_f + \frac{1}{3} S_g \Delta t_k^2}}, \text{ and} \quad (3b)$$

$$c_k = \sqrt{\frac{S_f S_g + \frac{1}{12} S_g^2 \Delta t_k^2}{S_f + \frac{1}{3} S_g \Delta t_k^2}} \quad (3c)$$

with $$S_f = \frac{1}{2} h_0 \text{ and } S_g = 2\pi^2 h_{-2} \quad (4)$$

The tuning parameters $h_0$ (given in seconds units) and $h_{-2}$ (given in 1/sec units) are parameters of the Allan variance plot of the receiver clock. The 2-dimensional receiver clock process noise vector $w_{clk}$ is a zero-mean Gaussian discrete-time white-noise process with covariance matrix equal to the identity matrix.

The rate-gyro bias dynamics are modeled by a first-order Gauss-Markov process. This dynamic model takes the form:

$$b_{rg}(t_{k+1}) = e^{-\Delta t_k/\tau_{rg}} b_{rg}(t_k) + \sigma_{rgb}\sqrt{1-e^{-2\Delta t_k/\tau_{rg}}} w_{rgbk} \quad (5)$$

where $\tau_{rg}$ is the time constant of the process in seconds and $\sigma_{rgb}$ is its steady-state per-axis bias standard deviation in rad/sec. The 3-dimensional rate-gyro bias process noise vector $w_{rgbk}$ is i a zero-mean Gaussian discrete-time white-noise process with covariance matrix equal to the identity matrix.

The accelerometer bias dynamics are also modeled by a first-order Gauss-Markov process. This dynamic model is similar to that of the rate-gyro bias:

$$b_{acc}(t_{k+1}) = e^{-\Delta t_k/\tau_{acc}} b_{acc}(t_k) + \sigma_{accb} \sqrt{1 - e^{-2\Delta t_k/\tau_{acc}}} w_{accbk} \quad (6)$$

where $\tau_{acc}$ is the time constant of the process in seconds and $\sigma_{accb}$ is its steady-state per-axis bias standard deviation in m/sec$^2$. The 3-dimensional accelerometer bias process noise vector $w_{accbk}$ is a zero-mean Gaussian discrete-time white-noise process with covariance matrix equal to the identity matrix.

The dynamics models for the attitude quaternion, q, the position, r, and the velocity, v, are functions of the IMU outputs, the IMU bias models, and angular random-walk and velocity random-walk models. Suppose that the following discrete-time dynamic model corresponds to IMU dynamics propagation over multiple IMU sample intervals:

$$\begin{bmatrix} q(t_{k+1}) \\ r(t_{k+1}) \\ v(t_{k+1}) \end{bmatrix} = f_{IMU} \left( \begin{bmatrix} q(t_k) \\ r(t_k) \\ v(t_k) \end{bmatrix}, \begin{bmatrix} b_{rg}(t_k) \\ b_{acc}(t_k) \end{bmatrix}, \begin{bmatrix} w_{rgbk} \\ w_{accbk} \end{bmatrix}, \begin{bmatrix} w_{rgnk} \\ w_{accnk} \end{bmatrix}, \begin{bmatrix} y_{rgk1} \\ y_{acck1} \\ \vdots \\ y_{rgkn_{imu}} \\ y_{acckn_{imu}} \end{bmatrix}, \right. \quad (7)$$

$$\left. t_k, t_{k+1}, n_{imu}, \tau_{rg}, \sigma_{rgb}, \tau_{acc}, \sigma_{accb}, \sigma_{rgn}, \sigma_{accn} \right)$$

As an example, the function $f_{IMU}$ is explicitly implemented by the MATLAB function imu_multistep.m, which executes $n_{imu}$ calls of imu_imuonestep.m in order to perform IMU propagation over the successive IMU sample intervals from $t_k + \Delta t_k (i-1)/n_{imu}$ to $t_k + \Delta t_k i/n_{imu}$ for $i=1, \ldots, n_{imu}$. The $i^{th}$ IMU delta angle measurement is $y_{rgki}$, and the $i^{th}$ IMU delta velocity measurement is $Y_{accki}$. The 3-dimensional rate-gyro measurement noise vector $w_{rgnk}$ is zero-mean Gaussian discrete-time white-noise with covariance matrix equal to the identity matrix, and the 3-dimensional accelerometer measurement noise vector $w_{accnk}$ is zero-mean Gaussian discrete-time white-noise with covariance matrix equal to the identity matrix. These two random process noise vectors model the respective effects of rate-gyro angular random walk with a per-axis intensity of $\sigma_{rgn}$ rad/sec$^{0.5}$ and of accelerometer velocity random walk with a per-axis intensity of $\sigma_{accn}$ m/sec$^{1.5}$.

Normally the Kalman filter will use the a priori bias- and random-walk process noise estimates $w_{rgbk}=0$, $w_{accbk}=0$, $w_{rgnk}=0$, and $w_{accnk}=0$. In a smoothing calculation, however, non-zero estimates may be used. In the general case, the $i^{th}$ call of imu_onestep.m will use the following corrected versions of the IMU delta angle and delta velocity measurements to propagate from time $t_k + \Delta t_k (i-1)/n_{imu}$ to time $t_k + \Delta t_k i/n_{imu}$:

$$\begin{bmatrix} y_{rgki} \\ y_{accki} \end{bmatrix} - \frac{\Delta t_k}{n_{imu}} \begin{bmatrix} \left\{1 + \left(\frac{2i-1}{2n_{imu}}\right)(e^{-\Delta t_k/\tau_{rg}} - 1)\right\} b_{rg}(t_k) \\ \left\{1 + \left(\frac{2i-1}{2n_{imu}}\right)(e^{-\Delta t_k/\tau_{acc}} - 1)\right\} b_{acc}(t_k) \end{bmatrix} - \quad (8)$$

$$\frac{\Delta t_k}{n_{imu}} \begin{bmatrix} \left(\frac{2i-1}{2n_{imu}}\right) \sigma_{rgb} \sqrt{1 - e^{-2\Delta t_k/\tau_{rg}}} w_{rgbk} \\ \left(\frac{2i-1}{2n_{imu}}\right) \sigma_{accb} \sqrt{1 - e^{-2\Delta t_k/\tau_{acc}}} w_{accbk} \end{bmatrix} - \frac{\sqrt{\Delta t_k}}{n_{imu}} \begin{bmatrix} \sigma_{rgn} w_{rgnk} \\ \sigma_{accn} w_{accnk} \end{bmatrix}$$

This correction formula subtracts estimated biases from the raw IMU measurements. The estimated bias correction for each IMU sample interval equals the linear interpolation between $[b_{rg}(t_k); b_{acc}(t_k)]$ and $[b_{rg}(t_{k+1}); b_{acc}(t_{k+1})]$, the latter vector determined from Eqs. (5) and (6), to the center point of the $i^{th}$ IMU sample interval. This formula also removes the effects of dimensionalized estimates of the angular and velocity random walk errors. These IMU measurement errors are modeled as being constant over the $n_{imu}$ IMU sample intervals that span from time $t_k$ to time $t_{k+1}$.

In the current iGPS design, $n_{imu}=2$ IMU samples per major sample interval of the Kalman filter. The IMU samples occur at 100 Hz. The Kalman filter performs its dynamic propagations and measurement updates at 50 Hz. Thus, the nominal value of $\Delta t_k$ is 0.020 sec. Note, however, that some 0.020 sec Kalman filter sample intervals will not involve any measurement update if no data are available beyond that of the IMU.

The dynamics model for the error in the IGRF magnetic field model is $$\Delta B_{igrf}(t_{k+1}) = \Delta B_{igrf}(t_k) \quad (9)$$

In other words, the IGRF field model error is presumed to be constant in ECEF coordinates. Note that this model could be modified to include process noise that would allow this error to vary with time in a stochastic manner. In that case, a reasonable model would take the form of a $1^{st}$-order Gauss-Markov process, as in Eq. (5). The time-constant is tuned based on the expected motion of the vehicle and based on the known variability of the field. Normally this time constant would be on the order of several hours unless the vehicle where moving very rapidly across great distances or near unmodeled Earth field anomalies with significant spatial derivatives. A reasonable value for the steady-state field model error standard deviation may be on the order of 400 nT per axis. Note that the existence of magnetic storms may change the values that are used in such a stochastic model. The purpose of adding this error state is to prevent the Kalman filter from relying too much on the accuracy of the IGRF field model. Such over-reliance may make the filter overly optimistic about the quality of the combined position/orientation information that it can deduce from magnetic field measurements. One important contribution of the magnetometer is to provide a yaw reference. Proper modeling of the possible magnitude and time variability of $\Delta B_{igrf}$ is important to the goal of deriving reasonable heading information from the magnetic field measurement.

The dynamics model comprises Eqs. (2), (5), (6), (7), and (9) and can be generally condensed into a single discrete-time model of the form:

$$x_{k+1} = f(x_k, w_k, t_k, t_{k+1}) \quad (10)$$

where the process noise vector is $$w_k = \begin{bmatrix} w_{clk} \\ w_{rgbk} \\ w_{accbk} \\ w_{rgnk} \\ w_{accnk} \end{bmatrix} \quad (11)$$

This vector has 14 elements. The dynamics models have been defined so that this process noise vector has a mean of zero and a covariance matrix equal to the identity matrix. Although not required, this convention simplifies the SRIF implementation of the EKF.

II. Measurement Models

This section defines the mathematical measurement models for the Iridium™ pseudorange, the Iridium™ carrier Doppler shift, the magnetometer, the terrain map or the altimeter, and the pseudo-measurement of the zero-valued side slip of the rear wheel. This section develops the models of how these measured quantities depend on the state vector elements. The measurement times typically do not correspond to end points of IMU sample intervals, i.e., to the defined time $t_k$, $t_{k+1}$, etc., as defined in the dynamic propagation section. Therefore, this section also defines an interpolation method that models how a given measurement at a general time depends on the state and the process noise at the start of the relevant IMU sample interval.

A. Measurement at an Arbitrary Time

In general, any of the measurements associated with this Kalman filter can occur at an arbitrary time during the time interval from $t_k$ to $t_{k+1}$. Suppose that the $j^{th}$ measurement of the $k^{th}$ sample interval occurs at time is $t_{mkj}$ with $t_k < t_{mkj} \leq t_{k+1}$. Suppose, also, that the model of this measurement takes the form:

$$(y_{k+1})_j = \tilde{h}[x(t_{mkj});k,j,t_{mkj}] + v_{kj} \quad (12)$$

where $y_{k+1}$ is the normalized vector of all measurements, other than IMU measurements, that occur during the time interval $(t_k, t_{k+1}]$, where $(y_{k+1})_j$ is the $j^{th}$ element of that vector, where $\tilde{h}$ is the scalar function that defines how the normalized version of the $j^{th}$ measurement depends on the state at the measurement time, and where $v_{kj}$ is the zero-mean, unit-variance measurement noise.

In keeping with standard SRIF conventions, the measurement error for any normalized measurement will be designated by a scalar v or a vector v. Every scalar or vector so designated will be modeled as being a Gaussian random noise term with a mean of zero and with a variance equal to 1 for a scalar, or with a covariance equal to the identity matrix for a vector. The term "normalized measurement" is reserved in this document for measurements whose errors correspond to this definition. In fact, all vectors denoted as v throughout the remainder of this document will be zero-mean, identity-covariance Gaussian random vectors, in keeping with standard SRIF conventions.

An alternate version of Eq. (12) can be used in the SRIF EKF calculations that keep track of state estimates at IMU integration interval start/stop times $t_k$, $t_{k+1}$, .... This alternate version expresses $(y_{k-1})_j$ in terms of $x_k = x(t_k)$ and $w_k$. The corresponding formula can be developed by recognizing that $x(t_{mkj})$ can be expressed in terms of $x_k$ and $w_k$ by developing a generalization of Eq. (10), one that allows for state propagation to any arbitrary time in the interval $(t_k, t_{k+1}]$. Formally, one may write:

$$x_k(t_{mkj}) = \tilde{f}(x_k, w_k; t_k, t_{k+1}, t_{mkj}) \quad (13)$$

The function $\tilde{f}$ represents the partial dynamic propagation from time $t_k$ to time $t_{mkj}$ of the component dynamics models in Eqs. (2), (5), (6), (7), and (9). In practice, for small enough $\Delta t_k$, a reasonable approximation of this function is $$[\tilde{f}(x_k, w_k; t_k, t_{k+1}, t_{mkj})]_l = (x_k)_l + \left(\frac{t_{mkj} - t_k}{\Delta t_k}\right)[f(x_k, w_k; t_k, t_{k+1}) - x_k]_l \quad (14)$$

for l=1, 2, 3, ..., 8, 13, 14, 15, ... 21. That is, a linear-in-time interpolation between $x_k$ and $x_{k-1}$ suffices for all of the state elements except the quaternion elements, the $9^{th}$ through $12^{th}$ elements.

A reasonable approximation of the quaternion elements of $\tilde{f}$ can be developed by using a linear-in-time interpolation of the rotation from $q_k = [(x_k)_9; (x_k)_{10}; (x_k)_{11}; (x_k)_{12}]$ to $q_{k+1} = [\{f(x_k, w_k; t_k, t_{k+1})\}_9; \{f(x_k, w_k; t_k, t_{k+1})\}_{10}; \{f(x_k, w_k; t_k, t_{k+1})\}_{11}; \{f(x_k, w_k; t_k, t_{k+1})\}_{12}]$. Suppose that quaternion multiplication is defined so that $q_c = q_b \otimes q_a$ if $A(q_c) = A(q_b)A(q_a)$, where $A(q)$ is the direction cosines matrix associated with quaternion q. Then the rotation quaternion to go from $q_k$ to $q_{k+1}$ is $$q_{\delta k} = q_{k+1} \otimes q_k^{-1} = q_{k+1} \otimes \begin{bmatrix} -(q_k)_1 \\ -(q_k)_2 \\ -(q_k)_3 \\ (q_k)_4 \end{bmatrix} \quad (15)$$

where $(q)^{-1}$ is the inverse of quaternion q. Therefore, $q_{k+1} = q_{\delta k} \otimes q_k$. One can use $q_{\delta k}$ to deduce its associated rotation angle:

$$\theta_{\delta k} = 2 \sin^{-1}[\sqrt{(q_{\delta k})_1^2 + (q_{\delta k})_2^2 + (q_{\delta k})_3^2}] \quad (16)$$

and rotation axis unit direction vector:

$$e_{\delta k} = \begin{cases} \frac{1}{\sqrt{(q_{\delta k})_1^2 + (q_{\delta k})_2^2 + (q_{\delta k})_3^2}} \begin{bmatrix} (q_{\delta k})_1 \\ (q_{\delta k})_2 \\ (q_{\delta k})_3 \end{bmatrix} & \text{if } \theta_{\delta k} > 0 \\ \begin{bmatrix} 1 \\ 0 \\ 0 \end{bmatrix} & \text{if } \theta_{\delta k} = 0 \end{cases} \quad (17)$$

where the $\theta_{\delta k} = 0$ option in Eq. (17) corresponds to an arbitrary rotation axis, consistent with the fact that the magnitude of the rotation is zero.

Given the definitions in Eqs. (15)-(17), one can define the partial rotation from time $t_k$ to time $t_{mkj}$ as follows:

$$q_{\delta mkj} = \begin{bmatrix} (e_{\delta k})_1 \sin(\theta_{\delta mkj}/2) \\ (e_{\delta k})_2 \sin(\theta_{\delta mkj}/2) \\ (e_{\delta k})_3 \sin(\theta_{\delta mkj}/2) \\ \text{sign}[(q_{\delta k})_4]\cos(\theta_{\delta mkj}/2) \end{bmatrix} \quad (18)$$

where the partial rotation angle is $\theta_{\delta mkj} = e_{\delta k}(t_{mkj} - t_k)/\Delta t_k$ and where sign[ ] is the sign function that returns +1 if its input argument is positive or zero and −1 if its input argument is negative. Note that this convention for sign[ ] is non-standard in its return of +1 when the input argument is zero.

The partial rotation in Eq. (18) can be used to develop the linear-in-time rotational interpolation of the quaternion elements of $x_k$ from time $t_k$ to time $t_{mkj}$. This formula takes the form:

$$\begin{bmatrix} [\tilde{f}(x_k, w_k; t_k, t_{k+1}, t_{mkj})]_9 \\ [\tilde{f}(x_k, w_k; t_k, t_{k+1}, t_{mkj})]_{10} \\ [\tilde{f}(x_k, w_k; t_k, t_{k+1}, t_{mkj})]_{11} \\ [\tilde{f}(x_k, w_k; t_k, t_{k+1}, t_{mkj})]_{12} \end{bmatrix} = q_{\delta mkj} \otimes q_k = q_{\delta mkj} \otimes \begin{bmatrix} (x_k)_9 \\ (x_k)_{10} \\ (x_k)_{11} \\ (x_k)_{12} \end{bmatrix} \quad (19)$$

Given a suitable approximation of the $\tilde{f}$ function of Eq. (13), one can develop a transformed version of the measurement model in Eq. (12). This transformed model has the desired form for purposes of developing the Kalman filter. It is $$(y_{k+1})_j = (h[x_k, w_k; k])_j + v_{kj} \quad (20)$$

where the $j^{th}$ element of the vector function h[ ] is defined in terms of the functions in Eqs. (12) and (13):

$$(h[x_k, w_k; k])_j = \check{h}[\tilde{f}(x_k, w_k; t_k, t_{k+1}, t_{mkj}); k, j, t_{mkj}] \quad (21)$$

The measurement model in Eq. (20) includes both measurement noise, $v_{kj}$, and process noise, $w_k$. Therefore, the SRIF Kalman filter calculations are tailored to properly account for this noise correlation effect.

Two of the measurement models involve the IMU coordinate system's rotation rate with respect to ECEF coordinates. Suppose that this rate is constant over the IMU integration interval from $t_k$ to $t_{k+1}$. Then it is $$\omega_k = \frac{\theta_{\delta k}}{\Delta t_k} e_{\delta k} \quad (22)$$

consistent with Eqs. (16) and (17) of the partial dynamic propagation model. This rotation rate vector is expressed in IMU coordinate axes.

The use of $\omega_k$ in a measurement model constitutes a departure from the generic measurement model functional form $\check{h}[x(t_{mkj}); k, j, t_{mkj}]$. This is true because the $\omega_k$ formula in Eq. (22), when coupled with Eqs. (10), (15), (16), and (17), implies that $\omega_k$ can be written as a function of $x_k$ and $w_k$, but not as a function only of $x(t_{mkj})$. Therefore, any measurement at time $t_{mkj}$ that depends on $x(t_{mkj})$ and $\omega_k$ can be expressed in the generalized form $\check{h}[x(t_{mkj}), x_k, w_k; k, j, t_{mkj}]$, but not in the simpler form $\check{h}[x(t_{mkj}); k, j, t_{mkj}]$. Nevertheless, it is still possible to transform this new measurement model form into the form of Eq. (20). The needed transformation is:

$$(h[x_k, w_k; k])_j = \check{h}[\tilde{f}(x_k, w_k; t_k, t_{k+1}, t_{mkj}), x_k, w_k; k, j, t_{mkj}] \quad (23)$$

The remainder of this section defines the $\check{h}$ or $\check{h}$ measurement functions that apply at arbitrary measurement times $t_{mkj}$. It will be understood that the Kalman filter is developed after transforming each one of these functions into the form of Eq. (20) by using the formula in Eq. (21) or the formula in Eq. (23).

B. Iridium™ Pseudorange Measurement

The Iridium™ pseudorange measurement is constructed from the navigation receiver output for a downlink burst of data. This can come either from a broadcast burst, an enhanced narrow-band signal, or an advanced waveform signal. The former two consist of 207 25 kHz symbols, or 8.28 msec of signal, and the latter consists of 508 symbols, or 20.32 msec of received signal. The receiver implements delay-lock loop (DLL) calculations that yield an estimate of the mid-point of the reception time of the signal, as measured using receiver clock time. This mid-point time constitutes the $t_{mkj}$ value of the measurement.

In order to construct and use this measurement, two additional pieces of information are used. The first is a system best estimate of the time when the corresponding signal packet midpoint left the Iridium™ spacecraft. Call that time $t_{Tkj}$. This time is given as a GPS time of the same week that is used to define $t_{mkj}$, and it has all transmitter clock errors removed. Normally this removal of transmitter clock errors is accomplished using a navigation receiver from a base station. The second piece of information is a parameterization of the orbit of the Iridium™ spacecraft that broadcast the signal. This parameterization may take the form of the ECEF position time history of the spacecraft $r_I(t;p)$, where p is a vector of parameters that characterize the orbit. This function can be parameterized as a sequence of weighted sums of Chebyshev polynomials of degree 0 through 23, each covering a span of 1500 seconds with a separate weighted polynomial sum for each ECEF component of $r_I(t;p)$. The vector p contains the start times, durations, and polynomial weighting coefficients of each 1500 sec span. It is typical for p to store 20 spans, i.e., 8.3333 hours worth of orbit parameterization data.

The normalized pseudorange measurement is computed using the transmission and reception times as follows:

$$y_{PRkj} = \frac{c(t_{mkj} - t_{Tkj})}{\sigma_{PRkj}} \quad (24)$$

where c is the speed of light in m/sec and $\sigma_{PRkj}$ is the predicated pseudorange measurement error standard deviation in meters.

This measurement error standard deviation depends on the length of the burst of downlink data, the received carrier-to-noise ratio, and the DLL-discriminator-like calculations that the receiver uses to estimate $t_{mkj}$ based on raw early, prompt, and late Iridium™ symbol accumulations. A typical model of the pseudorange measurement error standard deviation is $$\sigma_{PRkj} = c \sqrt{\frac{\Delta t_{eml}}{2(C/N_0)_{kj} \Delta t_{brst} 25000} \left[1 + \frac{1}{(C/N_0)_{kj} \Delta t_{brst}}\right]} \quad (25)$$

in units of meters, where c is given in units of m/sec. $\Delta t_{eml}$ is the spacing, in seconds, between the early and late 25 kHz symbol accumulations. $\Delta t_{brst}$ is the length of the downlink data burst in seconds (either 0.00828 sec for broadcast bursts or enhanced narrow-band data bursts or 0.02032 sec for advanced waveform data bursts). $(C/N_0)_{kj}$ is the carrier-to-noise ratio for this measurement in absolute Hz units. For a typical signal with $\Delta t_{eml} = 20 \times 10^{-6}$ sec, $t_{brst} = 0.00828$ sec, and $(C/N_0)_{kj} = 10^{5.5}$ Hz (i.e., 55 dB-Hz), the 1-6 pseudorange accuracy is $\sigma_{PRkj} = 117$ m. This formula is based on four assumptions: that a non-coherent dot product discriminator is used to compute $t_{mkj}$, that this discriminator's pre-detection accumulation interval is $t_{brst}$, that its effective bandwidth is $B_L = 1/t_{brst}$, and that the 40% square-root raised cosine filtering of the Iridium™ symbols does not affect this calculation. In practice, typical values of $\sigma_{PRkj}$ may be somewhat larger, as the first and last of these assumptions are not exactly true.

Equation (24) is one means for synthesizing the normalized Iridium™ pseudorange measurement, but the Kalman filter can also use a model of how this measurement depends on the system state at time $t_{mkj}$. This model is somewhat like the model of a GPS pseudorange measurement, with two key different elements. First, the method of synthesizing $r_I(t;p)$ is different as it uses a piecewise Chebyshev polynomial parameterization of the orbit rather than a Keplerian parameterization with perturbations. Second, the model includes a neutral atmosphere delay. The measurement model takes the form $$y_{PRkj} = \frac{1}{\sigma_{PRkj}} \{\rho_{kj} + c\delta t_R(t_{mkj}) + c\delta t_{iono}[t_{mkj} - \delta t_R(t_{mkj}), r_{antkj}, r_{satjk}] + \qquad (26)$$
$$c\delta t_{neua}[t_{mkj} - \delta t_R(t_{mkj}), r_{antkj}, r_{satjk}]\} + v_{kj}$$

where $$\rho_{kj} = \sqrt{(r_{antkj} - r_{satjk})^T (r_{antkj} - r_{satjk})} = \|r_{antkj} - r_{satjk}\| \qquad (27)$$

is the range from the vehicle antenna location in ECEF coordinates $$r_{antkj} = r(t_{mkj}) + A^T\{q(t_{mkj})\}\Delta r_{ant} \qquad (28)$$

at receiver time $t_{mkj}$ to the corrected transmitter location in the same ECEF coordinate system $$r_{satkj} = A_E(\delta t_{trkj}) r_I(t_{Tkj};p) \qquad (29)$$

at true transmission time $t_{Tkj}$. The transpose of the 3-by-3 direction cosines matrix $A\{q(t_{mkj})\}$ appears in Eq. (28) in order to transform the constant Iridium™ receiver antenna location given in IMU coordinates, $\Delta r_{ant}$, from IMU axes into ECEF axes. The 3-by-3 direction cosines matrix $$A_E(\delta t_{trkj}) = \begin{bmatrix} \cos(\omega_E \delta t_{trkj}) & \sin(\omega_E \delta t_{trkj}) & 0 \\ -\sin(\omega_E \delta t_{trkj}) & \cos(\omega_E \delta t_{trkj}) & 0 \\ 0 & 0 & 1 \end{bmatrix} \qquad (30)$$

appears in Eq. (29) in order to correct for the rotation of the ECEF coordinate axes that occurs during the transmission path delay $$\delta t_{trkj} = 1/c \rho_{kj} + \delta t_{iono}[t_{mkj} - \delta t_R(t_{mkj}), r_{antkj}, r_{antkj}, r_{satjk}] + \delta t_{neua}[t_{mkj} - \delta t_R(t_{mkj}), r_{antkj}, r_{satjk}] \qquad (31)$$

The angular rate $\omega_E = 7.2921151467 \times 10^{-5}$ rad/sec in Eq. (30) is the Earth's rotation rate. Equation (31) is implicit in $\delta t_{trkj}$ because $r_{satkj}$ on its right-hand side depends on $\delta t_{trkg}$, as per Eq. (29). Fortunately, this nonlinear equation can be solved by a simple iteration. This iteration uses a current guess of $\delta t_{trkj}$ in order to compute $r_{satkj}$ in Eq. (29), and it updates its $\delta t_{trkj}$ guess by using this $r_{satkj}$ value in the right-hand side of Eq. (31). This iteration normally converges very quickly when starting from the guess $\delta t_{trkj} = 0$ sec. Convergence to 16 significant digits in about 3 iterations is assured because $\delta t_{trkj}$ is typically smaller than 0.011 sec, and the resulting corrections in $r_{satkj}$ are typically smaller than 6 m.

The time delays $\delta t_{iono}(t, r_{ant}, r_{sat})$ and $\delta t_{neua}(t, r_{ant}, r_{sat})$ in Eqs. (26) and (31) are, respectively, the ionospheric and neutral atmosphere delays of the Iridium™ signal. Various models exist to compute these quantities. They depend on the time t and the receiver antenna location $r_{ant}$ through climate models or similar type models that are used to compute some of their parameters. These time delay functions depend on the transmitter location $r_{sat}$ because they depend on the line-of-sight (LOS) vector direction from the receiver to the satellite, $(r_{sat} - r_{ant})/\|r_{sat} - r_{ant}\|$. This LOS vector can be used to compute the satellite's local azimuth and elevation relative to the receiver.

The particular functions used to model the ionospheric delay and the neutral atmosphere delay can vary with some implementations. One possibility for the ionospheric delay is to use the GPS L1 Klobuchar model whose parameters are broadcast in the GPS navigation message. Such delays can be calculated by other models known in the art. The computed delay can then be re-scaled to account for the frequency difference between the GPS L1 signal and the Iridium™ signal. Suppose that the L-band Iridium™ carrier frequency for a particular data burst was $\omega_{LIkj}$ rad/sec. Then the $\delta t_{iono}$ value would be multiplied by the factor $[(2\pi 1575.42 \times 10^6)/\omega_{LIkj}]^2$ in order to compute the correct $\delta t_{iono}$ for use in Eqs. (26) and (31) above. This factor ranges from 0.950383304758592 at the low end of the Iridium™ L-band spectrum to 0.938777680262002 at the high end.

This particular ionosphere model neglects the fact that the Iridium™ spacecraft have a small but significant portion of the ionosphere above them and below the GPS spacecraft. Given the crudeness of the Klobuchar model, however, there is little reason to correct the model for this inaccuracy. If a more accurate ionospheric delay model were to be used, then it would make sense to correct for the fact that some of the ionosphere lies above the Iridium™ constellation.

One reasonable model of the neutral atmosphere delay function uses the Saastamoinen models of the zenith hydrostatic delay and the zenith wet delay along with the Ifadis hydrostatic and wet elevation mapping functions. These models use as inputs the temperature, barometric pressure, and relative humidity at the test vehicle. If these are lacking, one can use a neutral atmosphere climate model in order to deduce these parameters and compute temperature, pressure, and water vapor partial pressure as functions of the vehicle latitude, the vehicle altitude, and the day of the year. These computed quantities, in turn, can be used to compute the relative humidity. This value and the computed temperature and pressure from UNB3MM.m provide the needed meteorological inputs to the Saastamoinen zenith delay models and the Ifadis mapping functions.

Note that the pseudorange model in Eq. (26) lacks the usual transmitter clock error term that is found in GPS models. This lack is consistent with the assumption that the normalized pseudorange recipe used in Eq. (24) will employ a transmission time estimate $t_{Tkj}$ that has already been corrected for transmitter clock errors to the best ability of the iGPS reference station system to estimate such errors.

In summary, the pseudorange measurement model's $\tilde{h}[x(t_{mkj}); k, j, t_{mkj}]$ function is defined by the main first term on the right-hand side of Eq. (26). In order to evaluate this term, the corrected ECEF satellite transmission location $r_{satkj}$ and the signal path delay time $\delta t_{trkj}$ are first iteratively solved. One does this by starting with the guessed path delay $\delta t_{trkj} = 0$ and using Eqs. (30) and (29) to compute the associated $r_{satkj}$. This satellite transmission location, in turn, is substituted into the right-hand side of Eq. (31) in order to compute an updated guess of the path delay $\delta t_{trkj}$. This process is repeated perhaps 2 or 3 times until $r_{satkj}$ and $\delta t_{trkj}$ converge to machine precision. The resulting $r_{satkj}$ is substituted into the range calculation in Eq. (27) and into the ionosphere and neutral atmosphere delay models, and the results are combined as on the right-hand side of Eq. (26) to compute the associated value of $\tilde{h}[x(t_{mkj}); k, j, t_{mkj}]$.

The implicit determination of $\delta t_{trkj}$ based on Eq. (31) has an impact on the computation of partial derivatives of the associated $\tilde{h}[x(t_{mkj}); k, j, t_{mkj}]$ with respect to elements of the state vector $x(t_{mkj})$. Such partial derivatives are needed by the EKF. Suppose that one wants to compute $\partial \tilde{h}/\partial x_l$, the partial derivative of the $\tilde{h}[x(t_{mkj}); k, j, t_{mkj}]$ pseudorange measurement model with respect to the $l^{th}$ element of $x(t_{mkj})$. Any such calculation must recognize that there may be a non-zero partial derivative of $r_{satkj}$ with respect to $x_l$ due to the dependence of $r_{satkj}$ on $\delta t_{trkj}$ and due to the possible dependence of $\delta t_{trkj}$ on $x_l$ through Eq. (31). Thus, $$\frac{\partial r_{satkj}}{\partial x_l} = \frac{\partial r_{satkj}}{\partial \delta t_{trkj}} \frac{\partial \delta t_{trkj}}{\partial x_l} \quad (32)$$

where $$\frac{\partial r_{satkj}}{\partial \delta t_{trkj}} = \omega_E \begin{bmatrix} -\sin(\omega_E \delta t_{trkj}) & \cos(\omega_E \delta t_{trkj}) & 0 \\ -\cos(\omega_E \delta t_{trkj}) & -\sin(\omega_E \delta t_{trkj}) & 0 \\ 0 & 0 & 0 \end{bmatrix} r_I(t_{Tkj}; p) \quad (33)$$

One can develop an implicit equation for the partial derivative of $\delta t_{trkj}$ with respect to $x_l$ by differentiating both sides of Eq. (31) with respect to $x_l$. The result is:

$$\frac{\partial \delta t_{trkj}}{\partial x_l} = \frac{1}{c} \hat{\rho}_{kj}^T \left[ \frac{\partial r_{antkj}}{\partial x_l} - \frac{\partial r_{satkj}}{\partial \delta t_{trkj}} \frac{\partial \delta t_{trkj}}{\partial x_l} \right] - \left[ \frac{\partial \delta t_{iono}}{\partial t} + \right. \quad (34)$$
$$\left. \frac{\partial \delta t_{neua}}{\partial t} \right] \frac{\partial \delta t_R(t_{mkj})}{\partial x_l} + \left[ \frac{\partial \delta t_{iono}}{\partial r_{ant}} + \frac{\partial \delta t_{neua}}{\partial r_{ant}} \right] \frac{\partial r_{antkj}}{\partial x_l} +$$
$$\left[ \frac{\partial \delta t_{iono}}{\partial r_{sat}} + \frac{\partial \delta t_{neua}}{\partial r_{sat}} \right] \frac{\partial r_{satkj}}{\partial \delta t_{trkj}} \frac{\partial \delta t_{trkj}}{\partial x_l}$$

where $\hat{\rho}_{kj} = (r_{antkj} - r_{satkj})/\rho_{kj}$ is the LOS unit direction vector from the Iridium™ satellite to the vehicle antenna in ECEF coordinates. Although implicit, Eq. (34) is linear in the unknown partial derivative of $\delta t_{trkj}$ with respect to $x_l$, and it can be solved to yield:

$$\frac{\partial \delta t_{trkj}}{\partial x_l} = \quad (35)$$
$$\frac{1}{1+\eta_{kjl}} \left\{ \frac{1}{c} \hat{\rho}_{kj}^T \frac{\partial r_{antkj}}{\partial x_l} - \left[ \frac{\partial \delta t_{iono}}{\partial t} + \frac{\partial \delta t_{neua}}{\partial t} \right] \frac{\partial \delta t_R(t_{mkj})}{\partial x_l} + \left[ \frac{\partial \delta t_{iono}}{\partial r_{ant}} + \right. \right.$$
$$\left. \left. \frac{\partial \delta t_{neua}}{\partial r_{ant}} \right] \frac{\partial r_{antkj}}{\partial x_l} \right\}$$

where the scalar in the leading denominator term on the right-hand side of Eq. (35) is $$\eta_{kjl} = \frac{1}{c} \hat{\rho}_{kj}^T \frac{\partial r_{satkj}}{\partial \delta t_{trkj}} - \left[ \frac{\partial \delta t_{iono}}{\partial r_{sat}} + \frac{\partial \delta t_{neua}}{\partial r_{sat}} \right] \frac{\partial r_{satkj}}{\partial \delta t_{trkj}} \quad (36)$$

This non-dimensional scalar is typically on the order of $10^{-6}$, which means that it is significant enough to include in double-precision calculations.

Equation (35) includes partial derivatives of $\delta t_{iono}$ and $\delta t_{neua}$ with respect to t. These refer to differentiation with respect to the true time first argument of both of these functions, which holds true herein wherever time partial derivatives of these delay functions appear.

It may be possible to neglect all partial derivatives of the ionosphere and neutral atmosphere delay functions; ($\delta t_{iono}(t, r_{ant}, r_{sat})$ and $\delta t_{neua}(t, r_{ant}, r_{sat})$, as these may only contribute negligible corrections to the measurement model partial derivative $\partial \tilde{h}/\partial x_l$ when propagated through all of the partial derivative calculation steps described above.

Given the partial derivative of $\delta t_{trkj}$ with respect to $x_l$ in Eq. (35), it is straightforward to compute the partial derivative of $\tilde{h}[x(t_{mkj}); k, j, t_{mkj}]$ with respect to $x_l$ by partially differentiating the main first term on the right-hand side of Eq. (26). This partial differentiation accounts for the fact that $r_{antkj}$, $r_{satkj}$, and $\delta t_R(t_{mkj})$ all have the potential to have non-zero partial derivatives with respect to the $l^{th}$ element of the state vector $x(t_{mkj})$. This partial differentiation also uses Eqs. (33), (36), (35), and (32) in order to compute the necessary partial derivative of $r_{satkj}$.

C. Iridium™ Carrier Doppler Shift Measurement

The Iridium™ receiver can have the capability to independently measure the carrier Doppler shift for each downlink data burst. This measurement is made by using the in-phase and quadrature 25 kHz symbol accumulations of the downlink data burst. It is preferable that the effects of the 40% square-root raised cosine filter are removed from these accumulations prior to their being used to estimate the carrier Doppler shift. The actual estimation procedure involves the solution of a linearized least-squares problem for the linearly ramping carrier phase time history that best fits the symbol accumulations to a QPSK I/Q constellation. These accumulations are generated using a rough estimate of the carrier Doppler shift in a carrier numerically controlled oscillator (NCO) in order to mix the Iridium™ signal nearly to baseband before computing accumulations. The carrier Doppler shift from the NCO is added to that determined by the least-squares fit in order to produce the unnormalized carrier Doppler shift measurement that is output by the receiver, $\omega_{Doppkj}$, in rad/sec.

The normalized carrier Doppler shift measurement takes the form:

$$y_{Doppkj} = \frac{\omega_{Doppkj}}{\sigma_{Doppkj}} \quad (37)$$

where $\sigma_{Doppkj}$ is the measurement error standard deviation. In computing the $\omega_{Doppkj}$ measurement, the measurement error standard deviation can be a function only of the received carrier-to-noise ratio $(C/N_0)_{kj}$ and the downlink data burst duration $\Delta t_{brst}$:

$$\sigma_{Doppkj} = \frac{2.45}{\sqrt{(C/N_0)_{kj} \Delta t_{brst}^3}} \quad (38)$$

where $\sigma_{Doppkj}$ is given in rad/sec, $(C/N_0)_{kj}$ is expressed in absolute Hz units, and $\Delta t_{brst}$ is expressed in seconds. Thus, if $\Delta t_{brst} = 0.00828$ seconds and if $(C/N_0)_{kj} = 10^{5.5}$ Hz (i.e., 55 dB-Hz), then $\sigma_{Doppkj} = 5.78$ rad/sec (i.e., 0.920 Hz).

Equation (37) constitutes a recipe for computing the normalized Doppler shift measurement, but the Kalman filter also uses a model of how this quantity depends upon the state at the measurement time $x(t_{mkj})$. This measurement model is derived as follows: First, one differentiates the un-normalized version of the pseudorange of Eq. (26) with respect to receiver clock time. Second, one transforms from range rate to carrier Doppler shift through multiplication by the factor $-(1+\delta f_I)\omega_{Llkj}/c$. Third, one adds the direct transmitter clock rate perturbation $\delta f_I \omega_{Llkj}$. Finally, one normalizes the result via division by $\sigma_{Doppkj}$. Recall that $\omega_{Llkj}$ is the nominal carrier frequency of the received Iridium™ L-band signal. The quantity $\delta f_I$ is the non-dimensional Iridium™ transmitter clock frequency error, which will have been measured by an iGPS base station.

As a preliminary to this calculation, it is helpful to determine the time derivative of $r_{satkj}$ of Eq. (29) with respect to true reception time $t_{kj}=t_{mkj}-\delta t_R(t_{mkj})$. This calculation makes use of the following relationship between true reception time and true transmission time $$t_{Tkj}=t_{kj}-\delta t_{trkj}. \qquad (39)$$

If one defines the ECEF-relative velocity of the Iridium™ spacecraft at the time of transmission as $$v_I(t_{Tkj};p) = \left.\frac{dr_I}{dt}\right|_{(t_{Tkj};p)} \qquad (40)$$

then the derivative of $r_{satkj}$ with respect to true reception time $t_{kj}$ is $$\frac{dr_{satkj}}{dt_{kj}} = \frac{\partial r_{satkj}}{\partial \delta t_{trkj}}\frac{d\delta t_{trkj}}{dt_{kj}} + A_E(\delta t_{trkj})v_I(t_{Tkj};p)\left[1-\frac{d\delta t_{trkj}}{dt_{kj}}\right] \qquad (41)$$

This equation requires the derivative of $\delta t_{trkj}$ with respect to $t_{kj}$. This time derivative is determined by solving the implicit equation that results from differentiating Eq. (31) with respect to $t_{kj}$. That equation is $$\frac{d\delta t_{trkj}}{dt_{kj}} = \frac{1}{c}\hat{\rho}_{kj}^T\left[v_{antkj} - \frac{dr_{satkj}}{dt_{kj}}\right] + \frac{\partial \delta t_{iono}}{\partial t} +$$
$$\frac{\partial \delta t_{neua}}{\partial t} + \left[\frac{\partial \delta t_{iono}}{\partial r_{ant}} + \frac{\partial \delta t_{neua}}{\partial r_{ant}}\right]v_{antkj} + \left[\frac{\partial \delta t_{iono}}{\partial r_{sat}} + \frac{\partial \delta t_{neua}}{\partial r_{sat}}\right]\frac{dr_{satkj}}{dt_{kj}} \qquad (42)$$

where the velocity of the vehicle antenna with respect to ECEF coordinates is $$v_{antkj}=v(t_{mkj})+A^T\{q(t_{mkj})\}(\omega_k \times \Delta r_{ant}) \qquad (43)$$

Equation (43) has been derived via time differentiation of Eq. (28) and recollection from Eq. (22) that the vector $\omega_k$ is the IMU rotation rate with respect to ECEF coordinates. One can substitute the right-hand side of Eq. (41) into Eq. (42) and solve the resulting linear equation for the derivative of $\delta t_{trkj}$ with respect to $t_{kj}$. The solution is $$\frac{d\delta t_{trkj}}{dt_{kj}} = \qquad (44)$$
$$\frac{1}{1+\xi_{kj}}\left\{\frac{1}{c}\hat{\rho}_{kj}^T v_{antkj} + \frac{\partial \delta t_{iono}}{\partial t} + \frac{\partial \delta t_{neua}}{\partial t} + \left[\frac{\partial \delta t_{iono}}{\partial r_{ant}} + \frac{\partial \delta t_{neua}}{\partial r_{ant}}\right]\right.$$
$$\left. v_{antkj} + \left[-\frac{1}{c}\hat{\rho}_{kj}^T + \frac{\partial \delta t_{iono}}{\partial r_{sat}} + \frac{\partial \delta t_{neua}}{\partial r_{sat}}\right]A_E(\delta t_{trkj})v_I(t_{Tkj};p)\right\}$$

where $$\xi_{kj} = \left[\frac{1}{c}\hat{\rho}_{kj}^T - \frac{\partial \delta t_{iono}}{\partial r_{sat}} - \frac{\partial \delta t_{neua}}{\partial r_{sat}}\right]\left[\frac{\partial r_{satkj}}{\partial \delta t_{trkj}} - A_E(\delta t_{trkj})v_I(t_{Tkj};p)\right] \qquad (45)$$

Given the $\delta t_{trkj}$ time derivative in Eq. (44) and given that $c[\delta t_{trkj}+\delta t_R(t_{mkj})]$ equals the pseudorange of Eq. (26), the normalized model of the received Doppler shift can be computed as follows:

$$y_{Doppkj} = \qquad (46)$$
$$\frac{\omega_{LIkj}}{\sigma_{Doppkj}}\left(-\{1+\delta f_I\}\left\{\frac{d\delta t_{trkj}}{dt_{kj}}[1-\delta f_R(t_{mkj})]+\delta f_R(t_{mkj})\right\}+\delta f_I\right)+v_{kj}$$

The leading negative sign inside the large parentheses on the right-hand side of Eq. (46) arises because Doppler shift is positive when pseudorange is decreasing. The $d\delta t_{trkj}/dt_{kj}$ term on the right-hand side of Eq. (46) includes the time derivatives of all of the pseudorange terms in Eq. (26), excepting the time derivative of the direct clock error term $\delta t_R(t_{mkj})$. Its time derivative is given by the last $\delta f_R(t_{mkj})$ term in Eq. (46). The factor $[1-\delta f_R(t_{mkj})]$ on the right-hand side of this equation is the derivative of the true reception time with respect to receiver clock time $dt_{kj}/dt_{mkj}$. The factor $\{1+\delta f_I\}$ on the right-hand side of Eq. (46) modifies the frequency coefficient of the pseudorange rate term in order to reflect the true transmitted frequency after correction for the transmitter clock rate error. The final $\delta f_I$ term on the right-hand side of Eq. (46) is the direct error due to transmitter frequency error. It accounts for the following effect: A transmitter clock error will induce a received Doppler shift in comparison to the expected nominal reception frequency even if the pseudorange and the receiver clock error are both constant. This Doppler shift model has been derived via differentiation of a carrier-phase model.

The leading main term on the right-hand side of Eq. (46) constitutes the $\tilde{h}[x(t_{mkj}),x_k,w_k;k,j,t_{mkj}]$ measurement model function that is associated with the carrier Doppler shift measurement. It can be evaluated after evaluating the right-hand sides of Eqs. (22), (43), (45) and (44). Partial differentiation of this $\tilde{h}[x(t_{mkj}),x_k,w_k;k,j,t_{mkj}]$ function with respect to the elements of $x(t_{mkj})$, $x_k$, and $w_k$ is needed by the EKF. It can be carried out by straightforward, though lengthy, propagation of the chain rule through all of these calculations. Similar to the partial derivative calculations of the pseudorange model, it may not be necessary to compute the second partial derivatives of the $\delta t_{iono}$ and $\delta t_{neua}$ functions that appear in the partial derivative calculations for the carrier Doppler shift measurement model. This is true because these second partial derivatives may not contribute significantly to the resulting Jacobian matrices. Note, however, that it probably is necessary to include the first partial derivatives of $\delta t_{iono}$ and $\delta t_{neua}$ that appear in Eqs. (44) and (45).

D. Magnetometer Measurement

A magnetometer measures the magnetic field vector in body-fixed coordinates at the location of the magnetometer. Suppose the magnetic field vector is measured by a vector magnetometer in IMU coordinate axes or suppose that the magnetometer measurement has been transformed into IMU coordinates. Suppose, also, that the measurement is given in units of nT and is the 3-by-1 vector $B_{imu}$. Then the normalized magnetometer measurement vector is $$y_{magkj} = \frac{B_{imu}(t_{mkj})}{\sigma_{mag}} \qquad (47)$$

where $\sigma_{mag}$ is the magnetometer measurement error standard deviation in nT. This measurement error standard deviation can include the effects of field model error, except for the low-frequency, bias-type error in the field model that is characterized by the three state vector elements in $\Delta B_{igrf}$. Typical values for $\sigma_{mag}$ may be 50-200 nT.

It is important to calibrate the magnetometer and to keep the magnetometer distant from electric devices that generate time-varying magnetic fields. Calibration can normally be carried out in order to estimate scale factors, relative misalignments of the axes, and biases. Such a calibration corrects for the influences of any permanent magnetic material or ferro-magnetic material in the vehicle. Calibration can be carried out if one knows the magnitude of the local magnetic field vector and if one puts the magnetometer-bearing vehicle through some attitude maneuvers. A significant yaw maneuver followed by a significant pitch or roll rotation should suffice. Perhaps one could perform a pitch rotation by temporarily driving partway up a steep slope.

The magnetometer should not be used if there are large current loops near it that have time-varying currents. Current loops could come from electrical equipment in the vehicle, such as an electric motor, or they could be in the environment. For example, electric subways are notorious for causing significant time-varying disturbances to the Earth's magnetic field.

The Kalman filter model of the magnetometer measurement takes the form:

$$y_{magkj} = \frac{A\{q(t_{mkj})\}\{B_{igrf}[r_{magkj}, t_{mkj} - \delta t_R(t_{mkj})] + \Delta B_{igrf}(t_{mkj})\}}{\sigma_{mag}} + \nu_{kj} \quad (48)$$

where $B_{igrf}(r,t)$ is the magnetic field vector as computed using the IGRF model and where $\Delta B_{igrf}(t_{mkj})$ is an estimated correction to this model as per the state vector definition in Eq. (1). The model vector $B_{igrf}(r,t)$ is given in nT units in ECEF coordinates. It is a function of ECEF magnetometer position $$r_{magkj} = r(t_{mkj}) + A^T\{q(t_{mkj})\}\Delta r_{mag} \quad (49)$$

and it also depends weakly on time. The constant vector $\Delta r_{mag}$ is the location of the magnetometer relative to the IMU coordinate system center and expressed along IMU axes. The leading A direction cosines matrix on the right-hand side of Eq. (48) is needed in order to transform from the ECEF coordinate system of the IGRF model to the IMU coordinate system of the magnetometer measurement vector.

The three elements of the main term on the right-hand side of Eq. (48) constitute three independent $\tilde{h}[x(t_{mkj});k,j,t_{mkj}]$ measurement function elements. Equation (48), in conjunction with Eq. (49), constitutes a recipe for how to compute these three elements.

Note that the receiver clock error correction in the $B_{igrf}$ time argument in Eq. (48) may not be used in some implementations. Similarly, the magnetometer moment arm correction in Eq. (49), the term involving $\Delta r_{mag}$, may not be used in some implementations.

The magnetometer measurement provides three types of navigation information. The main magnetometer information may be better understood by considering what the magnetometer measurement would indicate if the Earth's magnetic field were a simple dipole. At all but the highest magnetic latitudes, the dependence of $y_{magkj}$ on attitude serves as a heading reference, which is a key piece of information that the Kalman filter can derive from the magnetometer. The projection of $B_{igrf}(r,t)$ onto the nadir vector is a function of magnetic latitude. Therefore, the combination of IMU, which is sensitive to nadir, and magnetometer contains rough latitude information. This is the second type of information in the magnetometer. The third type of information is contained in the magnitude of $B_{igrf}(r,t)$. The magnitude is a function of altitude and magnetic latitude. Thus, it contains information about a linear combination of these two position components. Of course, given altitude from an altimeter and the magnetic latitude information in the angle between $B_{igrf}(r,t)$ and local nadir, this last piece of information is somewhat redundant. It remains useful, however, because its measurement uncertainty is statistically independent of the uncertainties in the other sources of altitude and magnetic latitude information. It will be understood that this discussion of the information in the magnetic field measurement serves as a heuristic justification for its usefulness, and is not necessarily a precise mathematical definition of all the nuances with which the Kalman filter interprets the model in Eq. (48).

The standard IGRF model of $B_{igrf}(r,t)$ is computed using a spherical harmonic expansion and a table of spherical harmonic coefficients that apply at a given epoch. It normally takes colatitude, longitude, and geocentric radius as inputs and outputs the field in local-level south-east-zenith coordinates. Transformations may be applied before and after the IGRF spherical harmonic expansion in order to develop a magnetic field model function of the form $B_{igrf}(r,t)$. The initial transformation computes colatitude, longitude, and geocentric radius from r. The final transformation is an orthogonal rotation from local-level coordinates to ECEF coordinates.

The IGRF spherical harmonic expansion can be costly to compute. The EKF can also compute the partial derivatives of $B_{igrf}(r,t)$ with respect to r. Therefore, computational cost of the $B_{igrf}(r,t)$ model can be a significant concern. A practical way to reduce computation is to develop a $2^{nd}$-order Taylor series approximation of $B_{igrf}(r,t)$ that is valid in the vicinity of a position $r_{nom}$ at a nominal time $t_{nom}$. A suitable approximate model takes the form:

$$B_{igrf}(r,t) \cong B_{igrf}(r_{nom}, t_{nom}) + \left.\frac{\partial B_{igrf}}{\partial r}\right|_{r_{nom},t_{nom}} (r - r_{nom}) + \quad (50a)$$

$$\frac{1}{2}\begin{bmatrix}(r-r_{nom})^T \left.\frac{\partial^2 (B_{igrf})_1}{\partial r^2}\right|_{r_{nom},t_{nom}} (r-r_{nom}) \\ (r-r_{nom})^T \left.\frac{\partial^2 (B_{igrf})_2}{\partial r^2}\right|_{r_{nom},t_{nom}} (r-r_{nom}) \\ (r-r_{nom})^T \left.\frac{\partial^2 (B_{igrf})_3}{\partial r^2}\right|_{r_{nom},t_{nom}} (r-r_{nom})\end{bmatrix}$$

$$\left.\frac{\partial B_{igrf}}{\partial r}\right|_{r,t} \cong \left.\frac{\partial B_{igrf}}{\partial r}\right|_{r_{nom},t_{nom}} + \begin{bmatrix}(r-r_{nom})^T \left.\frac{\partial^2 (B_{igrf})_1}{\partial r^2}\right|_{r_{nom},t_{nom}} \\ (r-r_{nom})^T \left.\frac{\partial^2 (B_{igrf})_2}{\partial r^2}\right|_{r_{nom},t_{nom}} \\ (r-r_{nom})^T \left.\frac{\partial^2 (B_{igrf})_3}{\partial r^2}\right|_{r_{nom},t_{nom}}\end{bmatrix} \quad (50b)$$

Experimentation has shown that it can be acceptable to use finite-differencing to compute the needed first and second partial derivatives of $B_{igrf}(r,t)$ for use in this model. Experimentation also shows that such a model allows for rapid computations and can achieve a reasonable accuracy within a +/−20 km box centered at $r_{nom}$.

E. Altimeter Measurement or Terrain Map Pseudo-Measurement

The geolocation Kalman filter uses a means of deducing vertical position or altitude that is independent of the Iridium™ measurements. An independent altitude measurement enables it to get a rough position estimate to an accuracy of 1-2 km or better from as few as one Iridium™ satellite pass. Two suitable methods of obtaining altitude information are described. One method is to use a pressure altimeter. This method will work for many vehicle systems, even an airplane. Another method is to use a terrain map or other local terrain data. Use of a terrain map presumes that the vehicle is at local ground level, which is reasonable for a wheeled vehicle.

Thus, an altitude pseudomeasurement may be an instrument measurement or another altitude constraint, for example, based on local terrain data. The altitude pseudomeasurement can also serve as a soft constraint on vertical velocity, e.g., based in part on knowledge of local terrain data.

The Kalman filter models for the pressure altimeter and for the terrain map both depend on the mathematical function h(r), where h is the altitude in meters relative to the WGS-84 ellipsoid. Note that a different font has been used for the altitude h in order to distinguish it from the generic nonlinear measurement functions $\tilde{h}$ of Eq. (12), h of Eq. (20), and $\check{h}$ of Eq. (23). The input vector r is the corresponding ECEF Cartesian position.

The pseudo-measurement altitude model associated with the terrain map also includes the ability to calculate the latitude $\phi(r)$ and the longitude $\lambda(r)$ relative to the WGS-84 ellipsoid. The computation of h(r) and $\phi(r)$ is implemented as a coupled iteration that solves a coupled set of nonlinear equations for these ellipse-relative quantities. The EKF will also employ partial derivatives of these quantities with respect to r. The procedure for computing the partial derivatives need not be iterative. One can apply differentiation with respect to r to the coupled nonlinear equations that define h and $\phi$. The result of differentiation with respect to $(r)_j$ is a system of coupled linear equations in $\partial h/\partial(r)_j$ and $\partial \phi/\partial(r)_j$, one that is easy to solve for these two partial derivatives.

The normalized altimeter measurement is $$y_{altkj} = \frac{h_{alt}(t_{mkj})}{\sigma_{alt}} \quad (51)$$

where $h_{alt}$ is the altimeter output in meters and $\sigma_{alt}$ is its measurement error standard deviation in meters. The corresponding Kalman filter measurement model is $$y_{altkj} = \frac{h[r(t_{mkj})]}{\sigma_{alt}} + v_{kj} \quad (52)$$

Thus, the first term on the right-hand side of Eq. (52) constitutes the $\tilde{h}[x(t_{mkj});k,j,t_{mkj}]$ measurement function for the barometric altimeter.

A terrain map can substitute for an altimeter if the application is to a wheeled vehicle or to a pedestrian who is known to be at ground level, e.g., who is not in a tall building or up on a tree. A terrain map can be re-cast into the form $h_{map}(\phi,\lambda)$, i.e., it gives altitude above the WGS-84 ellipsoid as a function of latitude and longitude measured with respect to that ellipsoid.

The terrain map $h_{map}(\phi,\lambda)$ can be viewed as providing a pseudo-measurement of altitude. In a geolocation Kalman filter, however, the terrain map "measurement" also depends on the latitude and longitude, which are not exactly known. Therefore, this pseudo-measurement is modeled as being a null measurement. A null measurement takes the form of a constraint: Some function of the Kalman filter state is known to equal zero to within a certain tolerance. In the case of the terrain map, this measurement model takes the form:

$$0 = \frac{h[r(t_{mkj})] - h_{map}\{\phi[r(t_{mkj})], \lambda[r(t_{mkj})]\}}{\sigma_{map}} + v_{kj} \quad (53)$$

$\sigma_{map}$ is the combined RMS error, in meters, of the terrain map and of the knowledge of the IMU's height relative to the terrain. This model takes the standard form if one defines its corresponding normalized pseudo-measurement to be $y_{mapjk}=0$. As with all of the other measurement models, this model's $\tilde{h}[x(t_{mkj});k,j,t_{mkj}]$ function equals the first term on the right-hand side of Eq. (53). Note: this formulation assumes that the function $h_{map}(\phi,\lambda)$ incorporates the bias due to the height of the IMU center above the actual terrain altitude.

The EKF differentiates the terrain map's $\tilde{h}[x(t_{mkj});k,j,t_{mkj}]$ function with respect to $x(t_{mkj})$. This translates into differentiation with respect to $r(t_{mkj})$ of the main term on the right-hand side of Eq. (53). The calculation involves partial differentiation with respect to r of the ECEF-to-WGS-84 functions h(r), $\phi(r)$, and $\lambda(r)$, partial differentiation with respect to $\phi$ and $\lambda$ of the terrain map function $h_{map}(\phi,\lambda)$, and application of the chain rule. Differentiation of the WGS-84 functions h(r) and $\phi(r)$ has been discussed above, and differentiation of $\lambda(r)$ is straightforward. The terrain map $h_{map}(\phi,\lambda)$ is parameterized in a differentiable manner, for example, using a bi-cubic spline formulation in order to provide continuous differentiability of $h_{map}(\phi,\lambda)$.

The terrain-map pseudo-measurement model in Eq. (53) acts as a soft constraint within the EKF. The model does not purport to know the altitude because it does not know the exact $\phi$ and $\lambda$ input arguments for the function $h_{map}(\phi,\lambda)$. Rather, it states that the 3-dimensional r vector is known, within a certain precision, to lie on the 2-dimensional surface manifold that is defined by the terrain map.

F. Zero-Side-Slip Pseudo-Measurement

In cases in which the vehicle is a wheeled land vehicle, non-holonomic velocity constraints are enforced by the wheels and can be used to aid the geolocation Kalman filter. One non-holonomic constraint that can be exploited is that the rear wheels do not experience any significant side slip relative to the ECEF coordinate system. This presumes, of course, that the vehicle is not skidding sideways on a wet or icy road or on gravel. The advantages of using such a constraint are twofold. First, this constraint is relatively simple to model and incorporate into the Kalman filter without additional sensors. Second, it provides a means of eliminating one component of horizontal velocity drift in the IMU. If the vehicle performs turns with sufficient magnitude and frequency, then these turns and the zero side-slip constraint act together to limit IMU-induced horizontal velocity drift.

As with the terrain map, the zero-side-slip condition is best modeled as a null pseudo-measurement, i.e., as a "soft" state constraint with a side-slip error standard deviation, which expresses the level of certainty that the side slip is zero. The statistical distribution of quantifiable uncertainty can be modeled as zero-mean unity-standard deviation Gaussian white noise. The zero-side-slip condition normalized null measurement model takes the form:

$$0 = \frac{\hat{e}_{axel}^T \{A[q(t_{mkj})]v(t_{mkj}) + \omega_k \times \Delta r_{rear}\}}{\sigma_{ss}} + v_{kj} \quad (54)$$

The constant unit direction vector $\hat{e}_{axel}$ points along the vehicle's rear axle and is expressed in IMU coordinate axes. The constant vector $\Delta r_{rear}$ is the location of the center of the rear axle expressed in the IMU coordinate system. $\sigma_{ss}$ is the side-slip error standard deviation; it expresses the level of certainty that the side slip is zero. Recall that $\omega_k$ is the angular velocity of the IMU coordinate system relative to ECEF coordinates, but expressed along IMU axes, as per Eq. (22). The main term on the right-hand side of Eq. (54) is the $\check{h}[x(t_{mkj}),x_k,w_k;k,j,t_{mkj}]$ function for this null pseudo-measurement, and $y_{slipjk}=0$ is its a priori known value. A standard deviation of $\sigma_{ss}=0.1$ m/sec (0.22 mph) seems like a reasonable choice for the a priori certainty that $y_{slipjk}=0$.

This model does not directly treat the possible effects of the rear suspension on $\Delta r_{rear}$. Flexure of the suspension could cause the mid-point of the rear axle to move in a vertical direction relative to the IMU coordinate system. Unmodeled vertical changes in $\Delta r_{rear}$ coupled with a non-zero roll-rate component of $\omega_k$ would cause errors in Eq. (54). The RMS value of these errors for the wheeled vehicle can be factored into the value of the tuning parameter $\sigma_{ss}$.

This measurement can be augmented by using odometer data from the vehicle's rear wheels. Common-mode rear wheel odometer data can limit the IMU horizontal velocity drift in a second direction, thereby obviating the need for any turning maneuvers in order to eliminate all IMU horizontal velocity drift. Differential rear wheel odometer data would augment the yaw rate sensing of the IMU, helping to quickly calibrate the yaw rate bias. For example, the vehicle can be equipped with such odometers and that the odometer data can be interfaced with the Kalman filter computer. Additional calibration states for the odometers can be used, for example, to account for wheel radius variations due to tire pressure variations.

Non-holonomic constraints generally are not suited to use for pedestrian navigation or for navigation in an airplane or a boat. However, other types of partial velocity models may be used for some of these systems in order to limit IMU velocity drift.

III. Extended Kalman Filter Propagation and Measurement Update that Uses an SRIF Implementation and the Multiplicative Quaternion Error Model The nonlinear Kalman filtering problem associated with the dynamic model in Section I and the measurement models in Section II can be posed as a maximum a posteriori (MAP) estimation problem in SRIF form. That problem form is Find: $x_{k+1}$ along with $x_i$ and $w_i$ for $i=0,\ldots k$ (55a)

to minimize:

$$J = \frac{1}{2}\sum_{i=0}^{k} \{w_i^T w_i + [y_{i+1} - h(x_i, w_i; i)]^T [y_{i+1} - h(x_i, w_i; i)]\} + \frac{1}{2}[\hat{R}_0 x_{err}(x_0, \hat{x}_0)]^T [\hat{R}_0 x_{err}(x_0, \hat{x}_0)]$$ (55b)

subject to: $x_{i-1}=f(x_i,w_i;t_i,t_{i+1})$ for $i=0,k$ (55c)

$q_i^T q_i=1$ for $i=0,k+1$ (55d)

where $\hat{R}_0$ is the square, non-singular initial square-root information matrix and $\hat{x}_0$ is the corresponding a posterior state estimate at the filter initialization time $t_0$.

The definition of the normalized vector measurement function $h(x_i,w_i;i)$ can change from sample to sample. This possibility is adequately indicated by its dependence on the sample index i. This dependence comes about partly because any given measurement defined in Section II may not be present during the $i^{th}$ IMU sample interval and partly because the time location $t_{mij}$ of a given measurement can vary within the sample interval. It is possible in some cases that the dimension of $h(x_i,w_i;i)$ can be zero for one or more sample intervals. In such cases, the corresponding $y_{i+1}$ also has dimension zero, and the corresponding term in the sum on the right-hand side of Eq. (55b) drops out of the Kalman filter problem definition.

The state vector perturbation function $x_{err}(x_i,\hat{x}_i)$ characterizes the difference between two versions of the state $x_i$ and $\hat{x}_i$. It is defined to be the vector of differences between the two states' elements, except that the difference of the quaternion part of the state is defined in terms of the first 3 elements of a multiplicative quaternion perturbation. This type of quaternion difference is used in order to respect the quaternion unit normalization constraint given in Eq. (55d). This constraint implies that the difference is characterized by 3 free parameters. The mathematical definition of this difference function is $$x_{err}(x_i, \hat{x}_i) = \begin{bmatrix} \delta t_R(t_i) - \delta \hat{t}_R(t_i) \\ \delta f_R(t_i) - \delta \hat{f}_R(t_i) \\ b_{rg}(t_i) - \hat{b}_{rg}(t_i) \\ b_{acc}(t_i) - \hat{b}_{acc}(t_i) \\ q_{err}[q(t_i), \hat{q}(t_i)] \\ r(t_i) - \hat{r}(t_i) \\ v(t_i) - \hat{v}(t_i) \\ \Delta B_{igrf}(t_i) - \Delta \hat{B}_{igrf}(t_i) \end{bmatrix}$$ (56)

where the 3-element quaternion perturbation function $q_{err}(q_a,q_b)$ is defined as $$q_{err}(q_a, q_b) = [I\;0] q_a \otimes \begin{bmatrix} -(q_b)_1 \\ -(q_b)_2 \\ -(q_b)_3 \\ (q_b)_4 \end{bmatrix} = \Xi^T(q_b)q_a$$ (57)

where $$\Xi(q) = \begin{bmatrix} (q)_4 & -(q)_3 & (q)_2 \\ (q)_3 & (q)_4 & -(q)_1 \\ -(q)_2 & (q)_1 & (q)_4 \\ -(q)_1 & -(q)_2 & -(q)_3 \end{bmatrix}$$ (58)

is a 4-by-3 matrix function of a quaternion that is often used in determining spacecraft attitude. The function $q_{err}(q_a,q_b)$ has been chosen to have the following property: If the 3-by-1 quaternion perturbation $\Delta q_{ab}=q_{err}(q_a,q_b)$, then this perturbation can be used in conjunction with $q_b$ to reconstruct $q_a$ via quaternion multiplication:

$$q_a = \begin{bmatrix} \Delta q_{ab} \\ \sqrt{1 - \Delta q_{ab}^T \Delta q_{ab}} \end{bmatrix} \otimes q_b = [\Xi(q_b), q_b] \begin{bmatrix} \Delta q_{ab} \\ \sqrt{1 - \Delta q_{ab}^T \Delta q_{ab}} \end{bmatrix}$$ (59)

These equations are needed in order to implement the technique of representing the quaternion error covariance and the quaternion measurement update in terms of the first 3 elements of a multiplicative quaternion error.

These definitions of the $x_{err}(x_i,\hat{x}_i)$ and $q_{err}(q_a,q_b)$ functions imply that the dimension of $x_{err}(x_i,\hat{x}_i)$ is one less than the dimension of $x_i$ and $\hat{x}_i$. That is, the number of elements in the vector $x_{err}(x_i,\hat{x}_i)$ is 20, but $x_i$ and $\hat{x}_i$ both have dimension 21.

The SRIF extended Kalman filter approximately solves the problem in Eqs. (55a)-(55d) in a recursive manner. This recursion uses the solution when the terminal sample index is k in order to pose and solve an approximation of the problem with terminal sample index k+1. The SRIF extended Kalman filter keeps track of its a posteriori state estimate at sample k, $\hat{x}_k$, and keeps track of the statistics of the possible estimation errors by using the following a posteriori square-root information equation:

$$\hat{R}_k x_{err}(x_k,\hat{x}_k) = -\hat{v}_k \qquad (60)$$

where $\hat{R}_k$ is a square, non-singular square-root information matrix, and $\hat{v}_k$ is a zero-mean Gaussian random vector with covariance equation to the identity matrix. The dimension of $\hat{R}_k$ is 20-by-20, and $\hat{v}_k$ has 20 elements. This form of the square-root information equation models estimation errors in $\hat{x}_k$ that respect the quaternion normalization constraint.

The square-root information matrix $\hat{R}_k$ characterizes the estimation error in $\hat{x}_k$ by giving the second moment of the error vector $x_{err}(x_k,\hat{x}_k)$ $$P_k = E\{x_{err}(x_k,\hat{x}_k)x_{err}^T(x_k,\hat{x}_k)\} = \hat{R}_k^{-1}\hat{R}_k^{-T} \qquad (61)$$

where the notation $(\ )^{-T}$ refers to the transpose of the inverse of the matrix in question.

The square-root information equation in Eq. (60) can be used to approximate the original problem in Eqs. (55a)-(55d) in the following form Find: $x_{k+1}$ along with $x_k$ and $w_k$ (62a)

to minimize: $J_{k+1} = 1/2 w_k^T w_k + 1/2[y_{k+1}-h(x_k,w_k;k)]^T$
$[y_{k+1}-h(x_k,w_k;k)] + 1/2[\hat{R}_k x_{err}(x_k,\hat{x}_k)]^T[(\hat{R}_k x_{err}(x_k,\hat{x}_k)]$ (62b)

subject to: $x_{k+1} = f(x_k,w_k;t_k,t_{k+1})$ (62c)

$q_k^T q_k = 1, q_{k+1}^T q_{k+1} = 1$ (62d)

A first-order EKF can be used to approximately solve this problem by linearizing the measurement function $h(x_k,w_k;k)$ and the dynamics function $f(x_k,w_k;t_k,t_{k+1})$ about $x_k = \hat{x}_k$ and $w_k=0$. Suppose that one expresses the perturbation of $x_k$ from $\hat{x}_k$ in terms of $\Delta x_k = x_{err}(x_k,\hat{x}_k)$ and that one expresses the perturbation of $x_{k+1}$ from $\bar{x}_{k+1} = f(\hat{x}_k,0;t_k,t_{k+1})$ in terms of $\Delta x_{k+1} = x_{err}(x_{k+1},\bar{x}_{k+1})$. Then the linearized form of the one-step Kalman filtering problem is Find: $\Delta x_{k+1}$ along with $\Delta x_k$ and $w_k$ (63a)

to minimize: $J_{k+1} = 1/2 w_k^T w_k + 1/2[y_{k+1}-h(\hat{x}_k,0;k) -$
$H_{xk}\Delta x - H_{wk}w_k]^T[y_{k+1}-h(\hat{x}_k,0;k)-H_{xk}\Delta x_k - H_{wk}w_k] +$
$1/2[\hat{R}_k \Delta x_k]^T[\hat{R}_k \Delta x_k]$ (63b)

subject to: $\Delta x_{k+1} = \Phi_k \Delta x_k + \Gamma_k w_k$ (63c)

where $H_{xk}$ and $H_{wk}$ are measurement model Jacobian matrices and where $\Phi_k$ and $\Gamma_k$ are dynamic model Jacobian matrices. The matrix $\Phi_k$ is the state error transition matrix. The matrices $H_{xk}$, $\Phi_k$, and $\Gamma_k$ have their quaternion parts projected onto the 3-dimensional tangent manifolds of the 4-dimensional quaternion hyperspheres $q_k^T q_k = 1$ and $q_{k+1}^T q_{k+1} = 1$. The projections of these Jacobians retain only the 3 unconstrained components of the multiplicative quaternion errors, which is why this linearized problem can drop the quaternion normalization constraints in Eq. (62d).

The Jacobian matrices, with all of the relevant projections for the multiplicative quaternion error model, are:

$$H_{xk} = \left.\frac{\partial h}{\partial x_k}\right|_{(\hat{x}_k,0;k)} \begin{bmatrix} I & 0 & 0 \\ 0 & \Xi(\hat{q}_k) & 0 \\ 0 & 0 & I \end{bmatrix} \qquad (64a)$$

$$H_{wk} = \left.\frac{\partial h}{\partial w_k}\right|_{(\hat{x}_k,0;k)} \qquad (64b)$$

$$\Phi_k = \begin{bmatrix} I & 0 & 0 \\ 0 & \Xi^T(\bar{q}_{k+1}) & 0 \\ 0 & 0 & I \end{bmatrix} \left.\frac{\partial f}{\partial x_k}\right|_{(\hat{x}_k,0;t_k,t_{k+1})} \begin{bmatrix} I & 0 & 0 \\ 0 & \Xi(\hat{q}_k) & 0 \\ 0 & 0 & I \end{bmatrix} \qquad (64c)$$

$$\Gamma_k = \begin{bmatrix} I & 0 & 0 \\ 0 & \Xi^T(\bar{q}_{k+1}) & 0 \\ 0 & 0 & I \end{bmatrix} \left.\frac{\partial f}{\partial w_k}\right|_{(\hat{x}_k,0;t_k,t_{k+1})} \qquad (64d)$$

where $\hat{q}_k$ is the quaternion part of $\hat{x}_k$ and $\bar{q}_{k+1}$ is the quaternion part of $\bar{x}_{k+1}$, i.e., the $9^{th}$ through $12^{th}$ elements.

The computation of these Jacobian matrices and projections can be accomplished by first computing straight-forward partial derivatives of the model equations that have been defined in Sections II and III. Afterwards, one applies the projections relevant to the multiplicative quaternion update. Note, however, that it may be convenient to directly compute only the projected partial derivatives of the IMU dynamic propagation function $f_{IMU}$, which is defined in Eq. (7). In fact, the MATLAB single-step IMU propagation function imu_onestep.m and the MATLAB multi-step IMU propagation function imu_multistep.m do just that when computing their contributions to the $\Phi_k$ and $\Gamma_k$ matrices. Similar combined quaternion differentiation and projection calculations can be implementable for the partial dynamic propagation function $\tilde{f}(x_k,w_k;t_k,t_{k+1},t_{mkj})$ that is defined in Eqs. (14) and (19) and for its effects on the measurement models, as per Eqs. (21) and (23).

The linearized problem form in Eqs. (63a)-(63c) can be solved using SRIF techniques to implement a combined dynamic propagation and measurement update. A standard SRIF decouples these two operations, first performing a dynamic propagation and then performing a measurement update. The two operations are combined because of the presence of the process noise term in the measurement model.

The application of SRIF techniques to Eqs. (63a)-(63c) starts by solving Eq. (63c) for $\Delta x_k$ in terms of $\Delta x_{k+1}$ and $w_k$. This is accomplished by inverting the $\Phi_k$ matrix. The result is substituted into the cost function in Eq. (63b). That cost term equals half the sum of the squares of the elements of the Gaussian noise vector on the extreme right-hand side of the following dynamic-propagation/measurement-update square-root information equation:

$$\begin{bmatrix} I & 0 \\ -\hat{R}_k \Phi_k^{-1} \Gamma_k & \hat{R}_k \Phi_k^{-1} \\ \{H_{wk} - H_{xk}\Phi_k^{-1}\Gamma_k\} & H_{xk}\Phi_k^{-1} \end{bmatrix} \begin{bmatrix} w_k \\ \Delta x_{k+1} \end{bmatrix} = \begin{bmatrix} 0 \\ 0 \\ y_{k+1}-h(\hat{x}_k,0;k) \end{bmatrix} - \begin{bmatrix} v_{wk} \\ \hat{v}_k \\ v_{yk} \end{bmatrix} \qquad (65)$$

The next step of the SRIF dynamic-propagation/measurement-update is to perform orthogonal/upper-triangular (QR) factorization of the block matrix on the left-hand side of Eq. (65). This produces a special orthonormal matrix $Q_k$. Left matrix multiplication of both sides of Eq. (65) by $Q_k^T$ yields the following upper-triangular system of equations:

$$\begin{bmatrix} \hat{R}_{wwk} & \hat{R}_{wxk+1} \\ 0 & \hat{R}_{k+1} \\ 0 & 0 \end{bmatrix} \begin{bmatrix} w_k \\ \Delta x_{k+1} \end{bmatrix} = \begin{bmatrix} \hat{z}_{wk} \\ \hat{z}_{k+1} \\ \hat{z}_{rk+1} \end{bmatrix} - \begin{bmatrix} \hat{v}_{wk} \\ \hat{v}_{k+1} \\ \hat{v}_{rk+1} \end{bmatrix} \quad (66)$$

where $\hat{R}_{wwk}$ and $\hat{R}_{k+1}$ are square, non-singular, upper-triangular square-root information matrices and where $\hat{z}_{wk}$, $\hat{z}_{k+1}$, and $\hat{z}_{rk+1}$ are nonhomogeneous vectors of appropriate lengths. The matrix $\hat{R}_{k+1}$ is the square-root information matrix that characterizes the statistical error model of the a posteriori error at sample k+1, as in Eq. (60) with k incremented by 1.

Minimization of half the sum of the squares of the noise components in Eq. (66) is the equivalent of solving the problem in Eqs. (63a)-(63c). This is true because of the orthonormal nature of the $Q_k^T$ transformation that has been applied to go from Eq. (65) to Eq. (66). This minimization is accomplished simply by setting the noise vectors to $\hat{v}_{wk}=0$, $\hat{v}_{k+1}=0$, and $\hat{v}_{rk+1}=\hat{z}_{rk+1}$ and by solving the upper two equations to yield the a posteriori state perturbation and process noise estimates:

$$\Delta \hat{x}_{k+1} = \hat{R}_{k+1}^{-1} \hat{z}_{k+1} \quad (67a)$$

$$\hat{w}_k = \hat{R}_{wwk}^{-1} [\hat{z}_{wk} - \hat{R}_{wxk+1} \Delta \hat{x}_{k+1}] \quad (67b)$$

although the process estimate in Eq. (67b) is often never computed in a filtering application.

The dynamic propagation and measurement update is completed by using the a posteriori state perturbation estimate $\Delta \hat{x}_{k+1}$ and the a priori state estimate $\bar{x}_{k+1}$ to compute the a posteriori state estimate $\hat{x}_{k+1}$. This calculation uses the multiplicative quaternion update. It takes the form $$(\hat{x}_{k+1})_l = (\bar{x}_{k+1})_l + (\Delta \hat{x}_{k+1})_l \text{ for } l = 1, \ldots, 8 \quad (68a)$$

$$\begin{bmatrix} (\hat{x}_{k+1})_9 \\ (\hat{x}_{k+1})_{10} \\ (\hat{x}_{k+1})_{11} \\ (\hat{x}_{k+1})_{12} \end{bmatrix} = [\Xi(\bar{q}_{k+1}), \bar{q}_{k+1}] \begin{bmatrix} (\Delta \hat{x}_{k+1})_9 \\ (\Delta \hat{x}_{k+1})_{10} \\ (\Delta \hat{x}_{k+1})_{11} \\ \sqrt{1 - \sum_{l=9}^{11} (\Delta \hat{x}_{k+1})_l^2} \end{bmatrix} \quad (68b)$$

$$(\hat{x}_{k+1})_l = (\bar{x}_{k+1})_l + (\Delta \hat{x}_{k+1})_{l-1} \text{ for } l = 13, \ldots, 21 \quad (68c)$$

An alternate form of the multiplicative quaternion update in Eq. (68b) can be used in situations where its square-root term may have a negative argument. That alternate form is:

$$\begin{bmatrix} (\hat{x}_{k+1})_9 \\ (\hat{x}_{k+1})_{10} \\ (\hat{x}_{k+1})_{11} \\ (\hat{x}_{k+1})_{12} \end{bmatrix} = [\Xi(\bar{q}_{k+1}), \bar{q}_{k+1}] \left\{ \frac{1}{\sqrt{1 + \sum_{l=9}^{11} (\Delta \hat{x}_{k+1})_l^2}} \begin{bmatrix} (\Delta \hat{x}_{k+1})_9 \\ (\Delta \hat{x}_{k+1})_{10} \\ (\Delta \hat{x}_{k+1})_{11} \\ 1 \end{bmatrix} \right\} \quad (69)$$

This alternate multiplicative update is equivalent to the one in Eq. (68b) to first order in $(\Delta \hat{x}_{k+1})_9$, $(\Delta \hat{x}_{k+1})_{10}$, and $(\Delta \hat{x}_{k+1})_{11}$. Therefore, it is equivalent to within the order accuracy of this first-order EKF.

The vector $\hat{z}_{rk+1}$ contains all of the filter's residual errors after the dynamic propagation and measurement update. The minimum value of the cost in Eq. (63b) is $J_{k+1}=0.5\hat{z}_{rk+1}^T\hat{z}_{rk+1}$. The scalar quantity $\hat{z}_{rk+1}^T\hat{z}_{rk+1}$ will be a sample from a chi-squared distribution if the EKF's statistical noise model is correct and if its linearizations are good approximations of the underlying nonlinear functions over the likely extent of the statistical uncertainties of the problem. The degree of this chi-squared distribution will equal the number of elements in $\hat{z}_{rk+1}$. Therefore, the quantity $\hat{z}_{rk+1}^T\hat{z}_{rk+1}$ can be used to check whether the filter is operating as expected. If this quantity is much larger than could possibly be produced by the corresponding chi-squared distribution, this can indicate that something wrong with the filter tuning, the EKF linearizations, or one or more of the sensor measurements.

One can easily update the estimate $\hat{x}_k$ to form the one-sample smoothed estimate $x^*_k$. This may be useful when using the geolocation Kalman filter's estimates in order to predict received carrier Doppler shifts, perhaps from a GPS satellite, at interim points in the time interval from $t_k$ to $t_{k+1}$. This calculation uses the inversion of the linearized dynamics in Eq. (63c) to compute the one-step smoothed value of the state perturbation from $\hat{x}_k$:

$$\Delta x^*_k = \Phi_k^{-1}[\Delta \hat{x}_{k+1} - \Gamma_k \hat{w}_k] \quad (70)$$

The smoothed state perturbation $\Delta x^*_k$ and the a posteriori state estimate $\hat{x}_k$ are then used in modified versions of Eqs. (68a), (68c), and (69), modifications that replace $\bar{x}_{k+1}$ by $\hat{x}_k$, $\bar{q}_{k+1}$ by $\hat{q}_k$, and $\Delta \hat{x}_{k+1}$ by $\Delta x^*_k$. The output of these modified equations is $x^*_k$.

It is important to give the EKF a reasonable initialization. Initialization involves the selection of the initial state estimate $\hat{x}_0$ and its initial estimation error square-root information matrix $\hat{R}_0$. If the initial state estimates in $\hat{x}_0$ are too far from the truth, the nonlinearities may cause divergence. If the initial error covariance matrix associated with $\hat{R}_0$, as per Eq. (61), is unreasonable, then the filter's performance may be poor or even divergent. Based on experimentation with a simpler geolocation EKF, initial position errors as large as 500 km may be tolerated. The initial attitude error, on the other hand, is preferably less than 60 deg in some cases. Otherwise, an initial nonlinear batch estimator may be needed to ensure convergence. The initial rate-gyro and accelerometer bias estimates are set to zero, and their initial covariances reflect the expected performance of the inertial sensor, e.g., IMU, being used. The initial clock rate error covariance is set to match the expected RMS oscillator frequency error after non-dimensionalization. The initial clock error is preferably on the order of 1 sec or less. The estimated initial magnetic field model corrections are set to zero, and the initial error standard deviation of each axis is about 400 nT. Use of finite initial RMS errors for the field model correction states allows this EKF to function reasonably well.

IV. Performance Based on Covariance Analysis

The performance of this system has been demonstrated via covariance analysis using the dynamic models of Section I and the measurement models of Section II. The altimeter measurement is used instead of terrain map data or local terrain data.

These models are used to implement the EKF calculations of Section III using simulated truth-model IMU data with the first vector on the right-hand side of Eq. (65) set to zero. No actual estimates need be produced so the state update computations in Eqs. (67a) and (68a)-(69) need not be carried out in this demonstration. Third, the Jacobian matrices in Eqs. (64a)-(64d) are calculated at truth-model values of the state $x_k$ rather than a posteriori estimated state values $\hat{x}_k$.

The output of this covariance analysis is a time history of square-root information matrices and their associated covariance matrices, $\hat{R}_0, \hat{R}_1, \hat{R}_2, \ldots, \hat{R}_k, \ldots$ and $P_0, P_1, P_2, \ldots, P_k, \ldots$. This type of analysis demonstrates EKF performance with reasonable filter tuning parameters, assuming the corresponding full EKF would not experience any significant problems with its linearized approximations of nonlinear functions, problems such as divergence.

The resulting covariance time history is a function of the truth-model trajectory. In other words, the accuracy of the system is dependent on the actual trajectory traversed, which is a typical property of nonlinear filters and is not an artifact of having demonstrated the EKF performance using a covariance analysis.

Figure 8:
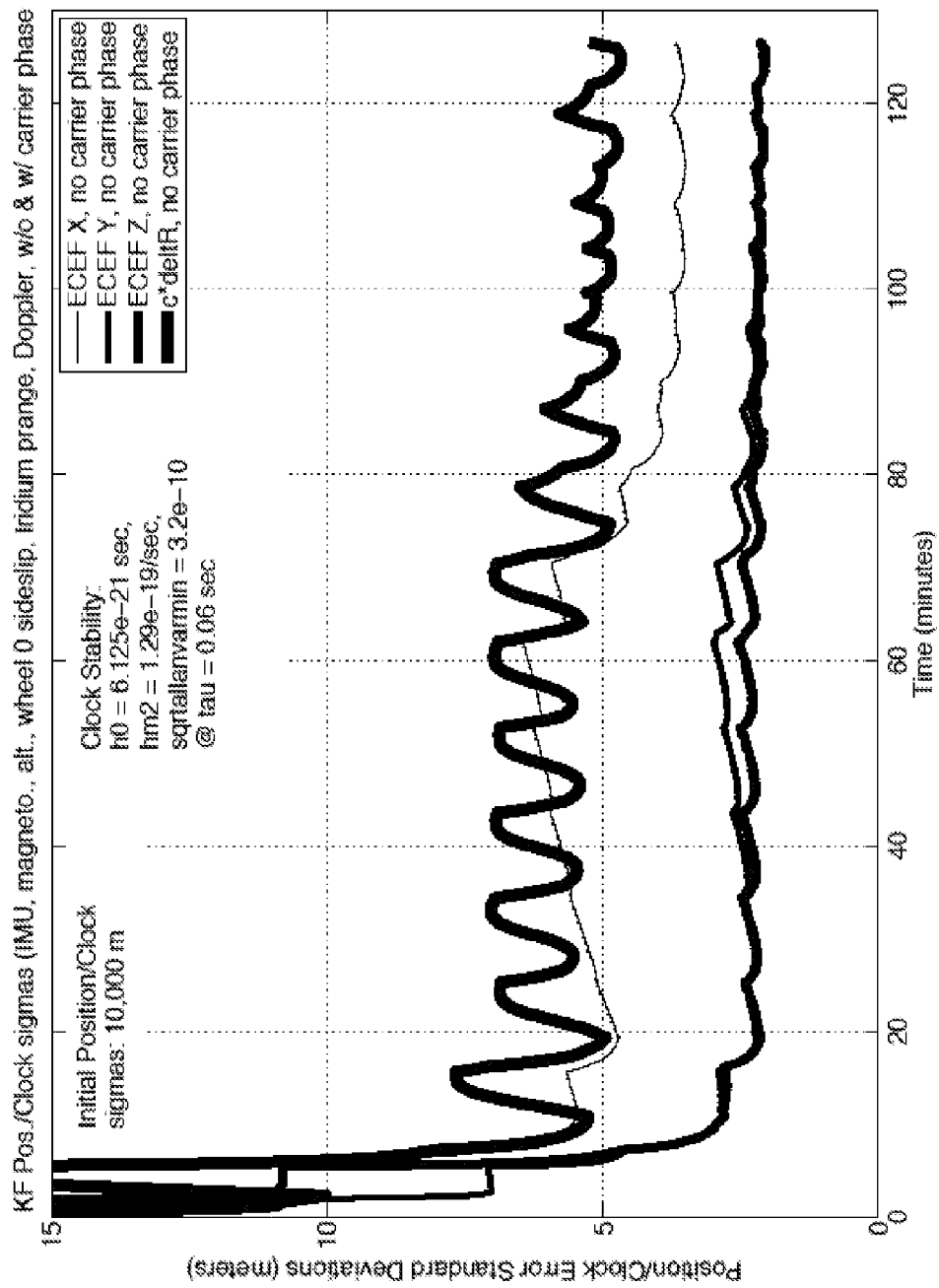
FIGS. 8 and 9 illustrate velocity and clock-rate standard deviation time histories for two EKF runs with multiple visible Iridium™ satellites.

A particular state trajectory will now be described for use in this covariance analysis. The roving receiver is positionally fixed on or with regard to a wheeled vehicle, e.g., Hummer, that continuously traverses a FIG. 8 pattern. The diameter of each loop of the FIG. 8 is about 30 meters. The vehicle completes each FIG. 8 in about 45.8 seconds, with speeds ranging from about 8.9 mph (4 m/sec) during the curved sections to 13.4 mph (6 m/sec) during short straight sections. The vehicle's FIG. 8's are centered at the latitude/longitude point (43.97 deg N., 103.45 deg W.), which is roughly somewhere in South Dakota. The relatively high latitude implies a reduced amount of time when satellites from only one plane are visible to the vehicle.

The following sensor accuracy tuning parameters have been used in this analysis:

| | | |
|---|---|---|
| $\sigma_{rgb}$ | $9.70 \times 10^{-5}$ rad/sec | (20 deg/hour) |
| $\tau_{rg}$ | 1000 sec or 100 sec | |
| $\sigma_{rgn}$ | $1.16 \times 10^{-4}$ rad/sec$^{0.5}$ | (0.4 deg/hour$^{0.5}$) |
| $\sigma_{accb}$ | 0.0196 m/sec$^2$ | (0.002 g) |
| $\tau_{acc}$ | 1000 sec or 300 sec | |
| $\sigma_{accn}$ | 0.004 m/sec$^{1.5}$ | |
| $\sigma_{PR}$ | 170 m | |
| $\sigma_{Dopp}$ | 12.6 rad/sec | (2 Hz) |
| $\sigma_{mag}$ | 100 nT | |
| $\sigma_{alt}$ | 5 m | |
| $\sigma_{ss}$ | 0.1 m/sec | |

Note that $\sigma_{alt}$ is likely more reasonable for a terrain map than for an altimeter despite the fact that the altimeter measurement model has been used in this study. Therefore, these results may be different when using an actual pressure altimeter.

The clock stability tuning parameters $h_0$ and $h_{-2}$ have been varied in order to study the effects of various possible levels of receiver clock stability. The actual values used are reported for each case discussed, along with the associated minimum root Allan variance and corresponding delay.

In a particular implementation, the sensor sample intervals are as follows. The inertial sensor is sampled once every 0.020 sec, i.e., at 50 Hz. This is also the EKF processing interval so that $n_{imu}=1$ and $\Delta t_k=0.020$ sec. For every visible Iridium™ satellite, the pseudorange is measured once every 0.54 sec (1.85 Hz), and the received carrier Doppler shift is measured once every 0.18 sec (5.56 Hz). An Iridium™ satellite is considered visible if its elevation is above 10 deg as viewed from the vehicle. The magnetometer is sampled once every 0.2 sec (5 Hz), and the altimeter is sampled once every 0.5 sec (2 Hz). The zero-side-slip pseudo-measurement is applied once every 0.5 sec (2 Hz).

The initial Kalman filter square-root information matrix $\hat{R}_0$ is set equal to a diagonal matrix of inverse initial standard deviations of the corresponding state components. The initial clock error standard deviation is set to $3.34 \times 10^{-5}$ sec (10 km equivalent range error), and the initial clock frequency error standard deviation is set to $10^{-6}$ sec/sec (300 m/sec equivalent range-rate error). The initial gyro and accelerometer per-axis bias error standard deviations are set equal to $\sigma_{rgb}$ and $\sigma_{accb}$, respectively. The initial per-axis attitude error standard deviations are 90 deg, the initial per-axis position error standard deviations are 10 km, and the initial per-axis velocity error standard deviations are 30 m/sec. The initial per-axis magnetic field model correction standard deviations are 400 nT.

Figure 5:
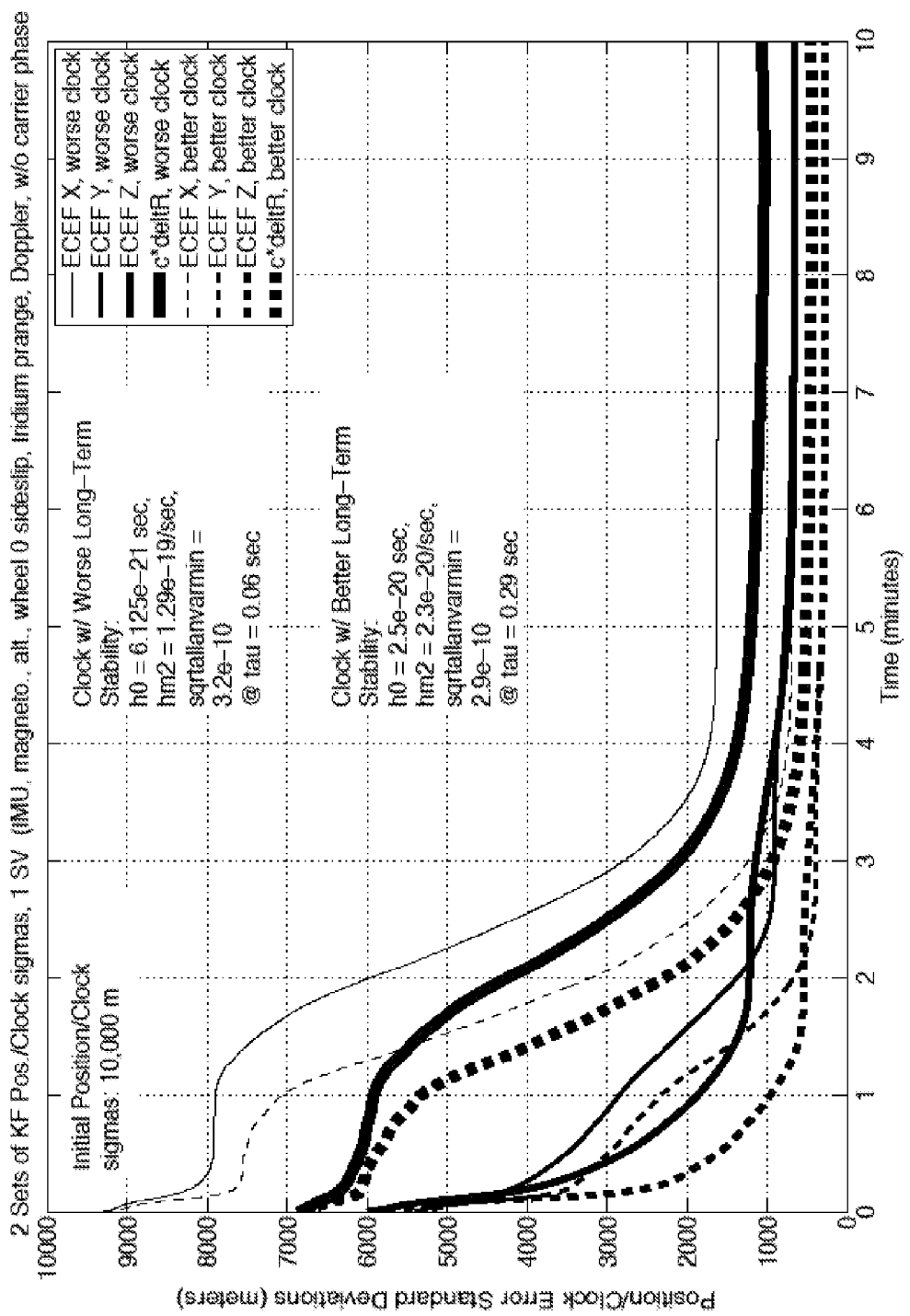
FIG. 5 illustrates position and clock standard deviation time histories for extended Kalman filter (EKF) runs with two different levels of clock stability in a single-satellite case.
Figure 6:
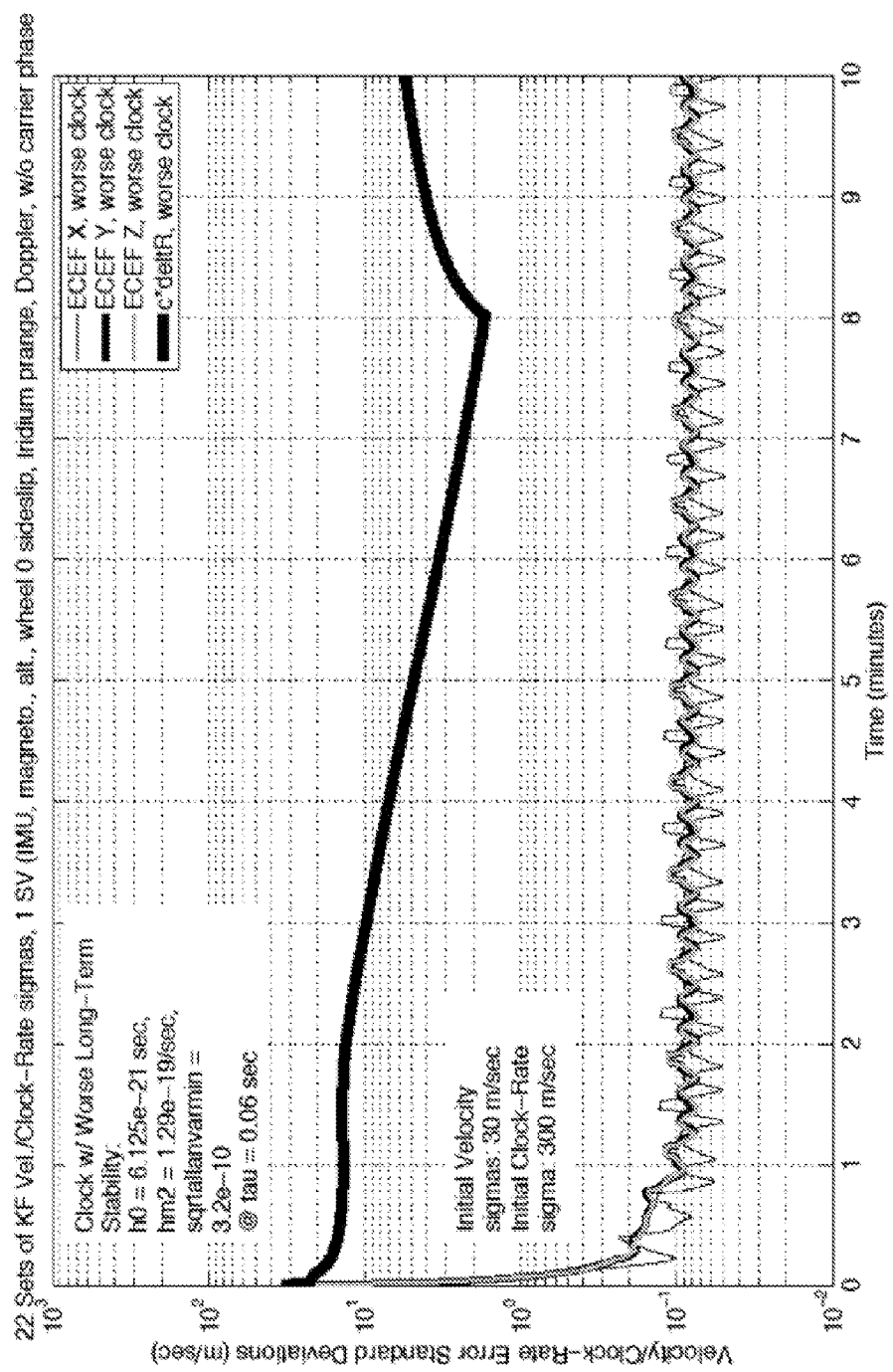
FIG. 6 illustrates velocity and clock-rate standard deviation time histories for EKF runs with two different levels of clock stability, in a single-satellite case.
Figure 7:
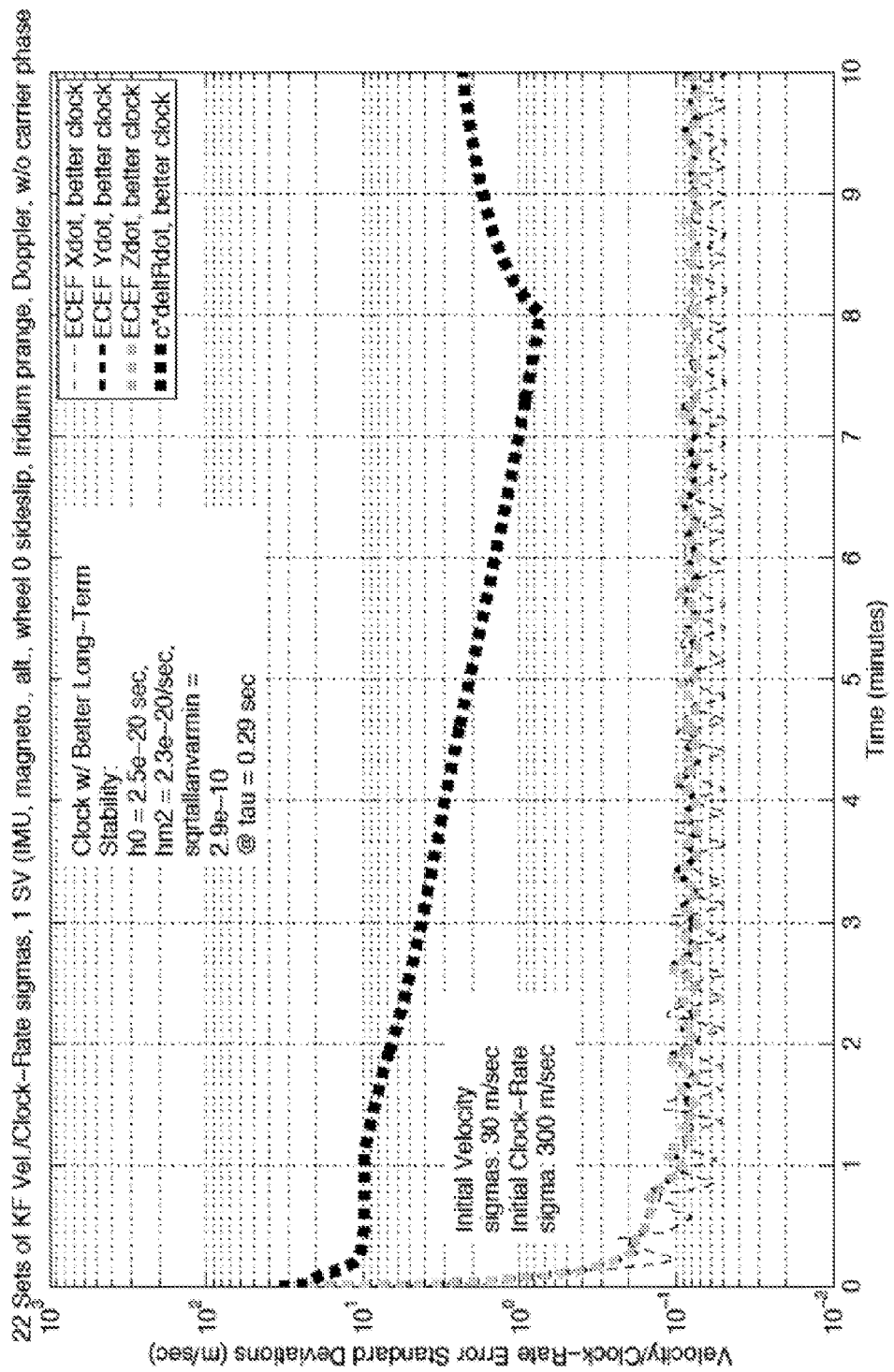
FIG. 7 illustrates position and clock standard deviation time histories for two EKF runs with multiple visible Iridium™ satellites.

With reference to FIGS. 5-7, results are shown for a test case for a single Iridium™ satellite that passed near the test vehicle with a peak elevation of 40 deg. FIG. 5 shows the filter's computed position and clock correction standard deviation time histories for five cases, one with a less stable oscillator and one with a more stable oscillator. The less stable oscillator has a stability at least as good as that experienced with a typical navigation receiver under dynamics. FIG. 6 shows the corresponding computed velocity and clock-rate correction standard deviation time histories for these two cases.

It is evident from the results in FIGS. 5-7 that the system is able to converge from large initial position, velocity, and clock uncertainties to much smaller ones. The filter with the worse clock converges to a worst-case per-axis position standard deviation of about 1700 m in four minutes. The filter with the more stable clock converges to better than 800 m of RMS error on its worst-case axis in the same amount of time.

These results are comparable to those that could be achieved using only Iridium™ pseudorange data, carrier Doppler shift data, and altitude information if the geolocation filter knew a priori that the receiver was completely static. Thus, the addition of the inertial sensor data, the magnetometer data, and the no-side-slip pseudo measurement serve to more fully characterize the effects of velocity. This conclusion is further confirmed by the results shown in FIGS. 6-7: The velocity error standard deviations are less than about 0.13 m/sec per axis after only one minute of filtering.

It is important to note that an improved clock stability can have a significant impact on the filter's convergence speed and steady-state accuracy for the position, clock correction, and clock-rate correction: Compare the solid curves (poorer clock) to their dotted counterparts (better clock) in FIGS. 5-7. Improved clock accuracy may be accomplished using a calibration from the accelerometer to the navigation radio clock corrections that removes the "hump" near the 10-20 second range of the navigation radio oscillator's Allan variance plot.

Two additional test cases similar to the two test cases of FIGS. 5-7, were conducted using Iridium™ carrier phase data with an assumed accuracy of 0.01 m 1-σ and with a measurement update every 0.18 seconds. These test runs produced slightly improved accuracy.

Additional tests were performed to determine the effects on this system of the availability of additional Iridium™ satellites. One such multi-satellite test case is described considering the entire Iridium™ constellation and using a run for slightly more than two hours in order to allow the Earth to rotate at least one full separation angle between the longitudes of the ascending nodes of two neighboring Iridium™ orbit planes.

The first ten minutes of this case, which included initial acquisition transients, are similar to the first ten minutes of the two earlier described cases, except that there are two satellites visible for the first 2.25 minutes, and after five minutes there are either two or three satellites visible. The initial availability of data from two satellites increased the speed of convergence of the filter.

Figure 9:
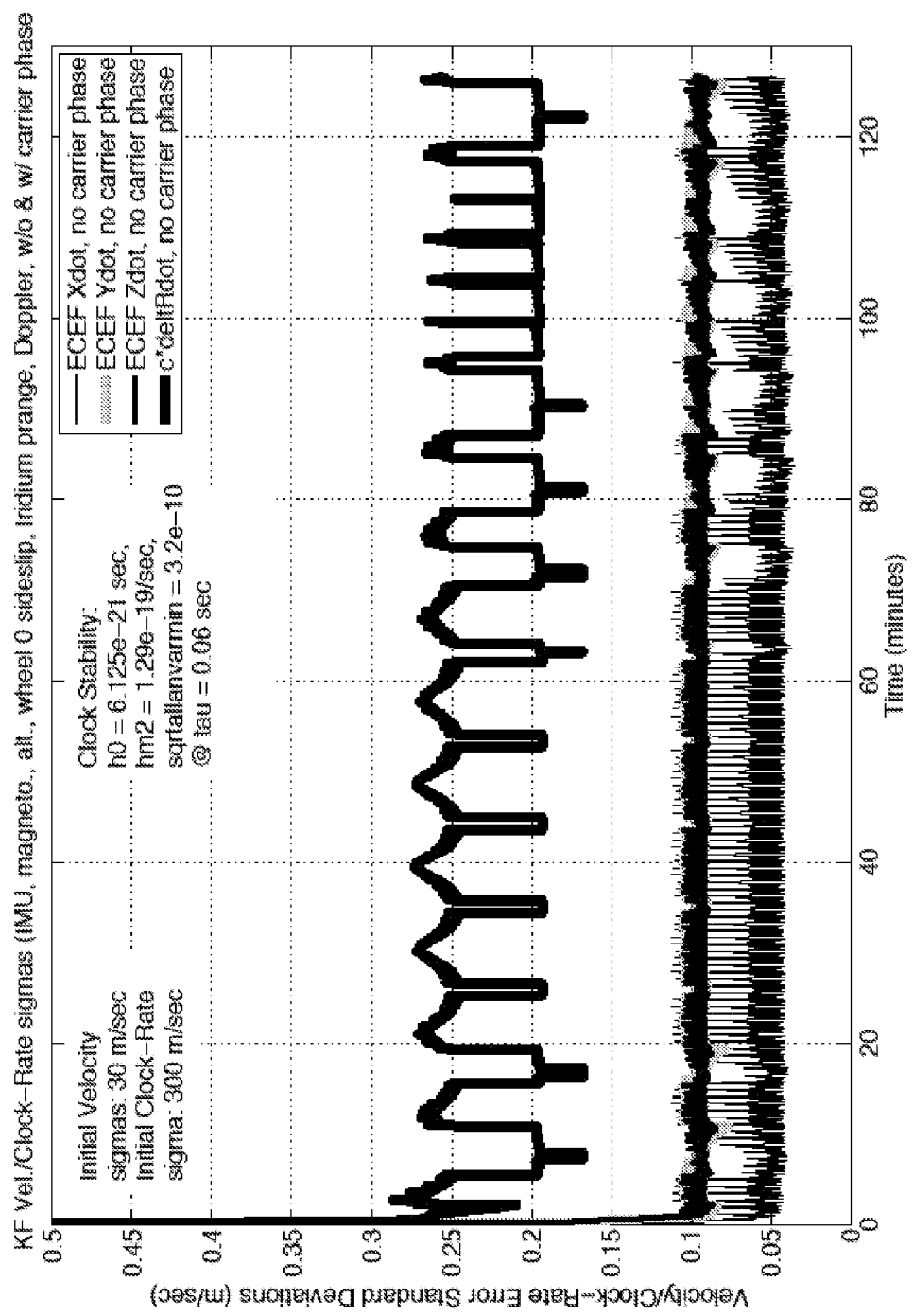

The results for the test case that excludes Iridium™ carrier phase observables are shown in FIGS. 8-9. The results in FIG. 8 indicate a very rapid convergence from initial position/clock-correction standard deviations of 10000 m to standard deviations of 7 m or less per axis after just ten minutes. Similarly, the per-axis velocity standard deviations in FIG. 9 converge from 30 m/sec to less than 0.12 m/sec in less than two minutes, and the clock-rate correction's standard deviation converges from 300 m/sec to less than 0.27 m/sec in a similar amount of time. After the initial convergence, these standard deviations all remain low, even when only one satellite is visible and even when that visible satellite passes almost directly overhead—at t=40 minutes. This latter situation is probably the worst case for this system and this simulated vehicle location.

In some cases it may be advantageous to process the Iridium™ carrier phase in addition to Iridium™ pseudorange and carrier Doppler shift. For example, if two or more satellites are visible, then Iridium™ carrier phase measurements may speed the initial convergence and may improve the clock rate correction accuracy.

The impact of oscillator stability in the multi-satellite case yields minimal discernable difference between sets of oscillator stability parameters that were shown to cause significant performance differences in the one-satellite cases of FIGS. 5-7. The primary noticeable difference is in the clock rate correction accuracy. A better oscillator yields a slightly lower steady-state standard deviation in the multi-satellite case.

These results indicate that this Kalman filter greatly enhances the ability of geolocation to aid the acquisition of GPS signals under jamming in a dynamic environment. GPS acquisition occurs quickly due to this filter's precise stand-alone accuracy after any initial interval when it has seen two or more Iridium™ satellites. A further advantage of this EKF is that many of its states are already in a form that has been used to develop an aiding system for GPS acquisition.

The results in FIGS. 8-9 indicate that this EKF can be used as a stand-alone global navigation system for wheeled vehicles that can be used even when GPS jamming is too heavy to enable GPS acquisition. Thus, this system may be used as a stand-alone alternative or back-up to GPS systems.

In some cases, it may be desirable to use the EKF as a basic filter and continuously acquire/re-acquire jammed GPS signals with aiding from the EKF. The resulting GPS data can be used, for example for single-epoch updates. These single-epoch updates can use the pseudorange and carrier Doppler shift as derived from each acquisition's long-dwell GPS accumulations. These long-dwell accumulations can employ a mixture of coherent and non-coherent integration in order to find jammed GPS signals. Each new GPS acquisition can execute rapidly due to this EKF's high level of accuracy after initial convergence. Therefore, each GPS "acquisition" is more akin to a standard computation of accumulations within a tracking loop. A GPS carrier-phase-based system can be implemented by augmenting the system to continuously track and use carrier phase data. Omitting the GPS carrier phase data can simplify the system in some cases.

In some implementations, additional dynamic maneuvering can improve system performance, e.g., by deviating occasionally from a straight trajectory, or otherwise creating additional dynamic data. For example, periodic lane changes may help maintain accuracy and reduce inertial sensor velocity drift along the direction of the freeway.

In some implementations, a magnetometer can be installed in the vehicle and be interfaced to the Kalman filter computer. Off-line calibration of the magnetometer can be performed to remove the usual bias, non-orthogonality, and scale-factor errors. Additional calibration may be performed to remove any magnetometer misalignment relative to the inertial sensor axes.

In some implementations, the navigation radio searches for GPS signals relative to the carrier-Doppler-shift and pseudo-range estimates that are produced by two filters.

In some implementations, both coherent integration and non-coherent integration can be used in GPS acquisition aided by the described EKF, employing a tuned approach in the coherent vs. non-coherent trade-off, and allowing very weak GPS signals to be acquired without the need for ultra-precise EKF aiding. Shorter coherent integration intervals enable the acquisition to function robustly when the aiding data are not very precise. Shorter coherent integration intervals also increase the net non-coherent integration time that is required for finding a GPS signal subject to a given level of jamming. Therefore, the described methods can provide some tolerance of EKF errors in consideration of the total length of the acquisition integration.

In some implementations, the EKF can be used to provide GPS acquisition and GPS single-epoch updates on a continuous basis, which can be particularly advantageous under severe GPS jamming. In some instances, the navigation algorithm need not employ an Iridium™-carrier-phase-based time stability transfer or GPS carrier phase data.

Other Embodiments

While the invention(s) is (are) described with reference to various embodiments, it will be understood that these embodiments are illustrative and that the scope of the invention(s) is not limited to them. Many variations, modifications, additions, and improvements are possible. For example, while particular LEO satellite signals, receivers and sensors have been described in detail herein, other variations will be appreciated based on the description herein. Furthermore, while certain illustrative signal processing techniques have been described in the context of certain illustrative applications, persons of ordinary skill in the art will recognize that it is straightforward to modify the described techniques to accommodate other suitable signal processing techniques.

Embodiments may be provided as a computer program product, or software, that may be encoded in a machine-readable medium having using instructions, which may be executed in a computer system (or other electronic device(s) such as a digital processor of a navigation radio) to perform a navigation method in accordance with some embodiments of the present invention. In general, a machine readable medium can include any mechanism for encoding information in a form (e.g., software, source or object code, functionally descriptive information, etc.) readable by a machine (e.g., a computer) including tangible storage incident to transmission of the information. A machine-readable medium may include, but is not limited to, magnetic storage medium (e.g., disks and/or tape storage); optical storage medium (e.g., CD-ROM, DVD, etc.); magneto-optical storage medium; read only memory (ROM); random access memory (RAM); erasable programmable memory (e.g., EPROM and EEPROM); flash memory; or other types of medium suitable for storing electronic instructions, operation sequences, functionally descriptive information encodings, etc.

In general, plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

The invention claimed is:

1. A vehicle navigation method comprising:
    receiving, from one or more LEO satellites, RF signals at a navigation radio;
    obtaining satellite ephemerides for a corresponding LEO satellite;
    deriving one or more range observables for the corresponding LEO satellite from the RF signals;
    establishing an altitude pseudomeasurement for the navigation radio;
    establishing a heading pseudomeasurement for the navigation radio;
    receiving at the navigation radio at least one of vehicle speed data, acceleration data, angular rate data and rotational angle data generated by one or more sensors onboard a vehicle moving at high dynamics; and
    using a processor, computationally calculating a position, velocity and time solution ("navigation solution") based on the one or more range observables; ephemerides for the corresponding LEO satellite; the altitude pseudomeasurement; the heading pseudomeasurement; one or more vehicle velocity pseudomeasurements orthogonal to the altitude pseudomeasurement; and the at least one of vehicle speed data, acceleration data, angular rate data and rotational angle data.

2. The navigation method of claim 1, further comprising acquiring a GPS signal based on the calculated navigation solution.

3. The navigation method of claim 2, wherein the GPS signal is acquired under jamming of a coarse acquisition code and wherein the GPS signal includes at least one of a Y-code, a M-code, an encrypted GPS code, a coarse acquisition code, a military GPS code, and a civil code.

4. The navigation method of claim 1, wherein the high dynamics of the vehicle includes speeds greater than about 12 mph.

5. The navigation method of claim 1, wherein the estimated navigation solution is accurate to about 10 m.

6. The navigation method of claim 1, wherein the one or more range observables includes at least one of a pseudorange measurement, a carrier phase measurement, and a Carrier Doppler shift frequency measurement.

7. The navigation method of claim 1, wherein the altitude pseudomeasurement is based on at least one of local terrain data, an altimeter measurement, and a barometer measurement.

8. The navigation method of claim 1, wherein the one or more orthogonal vehicle velocity pseudomeasurements includes a vehicle velocity constraint of substantially zero side-slip.

9. The navigation system of claim 1, wherein the heading pseudomeasurement is established by at least one of a magnetometer, a multi-antenna array, a sun sensor, a star tracker, a digital compass, a multiple hypothesis heading filter, and a LEO carrier phase measurement.

10. A navigation system comprising:
    at least one sensor onboard a vehicle and operable to output at least one of vehicle speed data, acceleration data, angular rate data and rotational angle data under high vehicle dynamics;
    a navigation radio coupled to the sensor to receive sensor data, the navigation radio comprising:
        an RF antenna operable to receive RF signals from one or more LEO satellites;
        an RF front end operable to downconvert and digitize the RF signals;
        a digital processor operable to derive one or more range observables from the downconverted RF signals for a corresponding LEO satellite; and
        a navigation algorithm operable on the digital processor to obtain a position, velocity and time solution ("navigation solution") based on the one or more range observables; ephemerides for the corresponding LEO satellite; a navigation radio altitude pseudomeasurement; a navigation radio heading pseudomeasurement; one or more vehicle velocity pseudomeasurements orthogonal to the altitude pseudomeasurement; and the at least one of vehicle speed data, acceleration data, angular rate data and rotational angle data.

11. The navigation system of claim 10, wherein the navigation radio is positionally fixed on the vehicle and the one or more vehicle velocity pseudomeasurements includes a vehicle velocity constraint of substantially zero wheel side-slip.

12. The navigation system of claim 11, wherein the heading pseudomeasurement is obtained via at least one of a magnetometer, a multi-antenna array, a sun sensor, a star tracker, a digital compass, a multiple hypothesis heading filter, and a LEO carrier phase measurement.

13. The navigation system of claim 11, wherein the navigation radio is further capable of acquiring a GPS signal including at least one of a Y-code, a M-code, an encrypted GPS code, a coarse acquisition code, a military GPS code, and a civil code based on the navigation solution obtained by the navigation algorithm.

14. The navigation system of claim 10, further comprising a second navigation radio capable of processing GPS signals and operable to acquire a GPS signal including at least one of a Y-code, a M-code, an encrypted GPS code, a coarse acquisition code, a military GPS code, and a civil code based on the navigation solution obtained by the navigation algorithm.

15. The navigation system of claim 10, wherein the altitude pseudomeasurement is based on at least one of local terrain data, an altimeter measurement, and a barometer measurement.

16. A navigation system comprising:
    a vehicle;
    a navigation radio positionally fixed on the vehicle;
    an RF antenna electrically coupled to the navigation radio and operable to receive RF signals from one or more LEO satellites;
    an RF front end operable to downconvert and digitize the RF signals to produce digital IF signals;
    a digital processor operable to derive one or more range observables from the digital IF signals for a corresponding LEO satellite;
    a sensor positionally fixed on the vehicle and coupled to the navigation radio, the sensor operable to generate at least one of vehicle speed data, acceleration data, angular rate data and rotational angle data under high vehicle dynamics; and
    a navigation algorithm operable on the digital processor to calculate a position, velocity and time solution ("navigation solution") based on the one or more range observables;
    ephemerides for the corresponding LEO satellite; a navigation radio altitude pseudomeasurement; one or more vehicle velocity pseudomeasurements orthogonal to the altitude pseudomeasurement; a heading pseudomeasurement; and the at least one of vehicle speed data, acceleration data, angular rate data and rotational angle data.

17. The navigation system of claim 16, further comprising a GPS radio and wherein the navigation solution is sufficiently accurate to allow acquisition of a GPS signal including at least one of a Y-code, a M-code, an encrypted GPS code, a coarse acquisition code, a military GPS code, and a civil code during a period of interference with a coarse acquisition signal.

18. The navigation system of claim 16, wherein the vehicle is one of a wheeled vehicle, an aircraft, and a boat.

19. The navigation system of claim 16, wherein the one or more vehicle velocity pseudomeasurements includes a velocity constraint of substantially zero side-slip.

20. The navigation system of claim 16, wherein navigation algorithm calculation includes data from at least one of a wheel rate sensor, a traction control unit, a steering sensor, a speedometer, an odometer, a tire pressure sensor, a pitot tube, and an anemometer.

21. The navigation system of claim 16, wherein the heading pseudomeasurement is generated by at least one of a magnetometer, a multi-antenna array, a sun sensor, a digital compass, a multiple hypothesis heading filter, and a LEO carrier phase measurement.

22. The navigation system of claim 16, wherein the altitude pseudomeasurement is based on at least one of terrain map data, an altimeter measurement, and a barometer measurement.

23. The navigation system of claim 16, wherein the navigation code includes an extended Kalman filter employing a measurement model, dynamics model, and a state vector definition wherein the state vector definition includes a navigation radio position, a navigation radio velocity, a sensor rate-gyro bias, a sensor accelerometer bias, and a navigation radio attitude estimate and wherein the measurement model defines a relationship between the state vector and each of the range observables and pseudomeasurements.

* * * * *